(12) United States Patent
Kindo

(10) Patent No.: US 6,327,583 B1
(45) Date of Patent: Dec. 4, 2001

(54) INFORMATION FILTERING METHOD AND APPARATUS FOR PREFERENTIALLY TAKING OUT INFORMATION HAVING A HIGH NECESSITY

(75) Inventor: Toshiki Kindo, Yokohama (JP)

(73) Assignee: Matshita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/506,600

(22) Filed: Feb. 18, 2000

Related U.S. Application Data

(62) Division of application No. 08/707,565, filed on Sep. 4, 1996.

(30) Foreign Application Priority Data

Sep. 4, 1995 (JP) .................................................... 7-226172
Feb. 20, 1996 (JP) ..................................................... 8-31547

(51) Int. Cl.[7] .................................................... G06F 17/00

(52) U.S. Cl. .................................. 706/45; 706/16; 706/21

(58) Field of Search ................................ 706/45, 59–61, 706/16, 21, 25; 707/2, 5, 6, 500

(56) References Cited

U.S. PATENT DOCUMENTS

| | | | |
|---|---|---|---|
| 5,048,100 | * 9/1991 | Kuperstein | 382/36 |
| 5,226,092 | * 7/1993 | Chen | 382/157 |
| 5,446,891 | * 8/1995 | Kaplan et al. | 707/2 |
| 5,535,382 | * 7/1996 | Ogawa | 395/600 |
| 5,619,709 | * 4/1997 | Caid et al. | 395/794 |

(List continued on next page.)

FOREIGN PATENT DOCUMENTS 6-243173 9/1994 (JP) .

OTHER PUBLICATIONS

H. Chen, "A machine learning approach to document retrieval: an overview and an experiment," Proceedings of the 27th Annual Hawaii International Conference on System Sciences, vol. 3, pp. 631–640, 1994.*

Schapire et al, "Boosting and rocchio applied to text filtering", SIGIR ACM pp. 215–223, Aug. 1998.*

(List continued on next page.)

*Primary Examiner*—Kakali Chaki
*Assistant Examiner*—Anil Khatri
(74) *Attorney, Agent, or Firm*—Israel Gopstein

(57) ABSTRACT

A user initially judges whether each of pieces of information input as learning information is necessary or unnecessary. Matrix elements of an affirmative metric signal indicating the records of the necessary information and matrix elements of a negative metric signal indicating the records of the unnecessary information are calculated in a learning unit from a plurality of keywords attached to the necessary information and the unnecessary information. Thereafter, a plurality of keywords attached to each piece of information data input to be estimated are converted into a vector in a vector generating unit, and an affirmative score signal and a negative score signal are calculated from the vector and the affirmative and negative metric signals in a score calculating unit. A value of the affirmative score signal is increased when many of keywords attached to a corresponding piece of information data are attached to the necessary information, and a value of the negative score signal is increased when many of keywords attached to a corresponding piece of information data are attached to the unnecessary information. Thereafter, necessity of each piece of information data is calculated from the affirmative and negative score signals, and the pieces of information data are stored in an unread data storing unit in order of necessity. Accordingly, information having a high necessity for the user can be easily retrieved from a large volume of information.

10 Claims, 18 Drawing Sheets

U.S. PATENT DOCUMENTS

| | | | |
|---|---|---|---|
| 5,692,176 * | 11/1997 | Holt et al. | 707/5 |
| 5,724,567 * | 3/1998 | Rose et al. | 707/2 |
| 5,802,504 * | 8/1998 | Suda et al. | 706/11 |
| 5,832,465 * | 11/1998 | Tom | 706/51 |
| 5,855,015 * | 12/1998 | Shoham | 707/5 |
| 5,907,841 * | 5/1999 | Sumita et al. | 707/6 |
| 6,064,971 * | 5/2000 | Hartnett | 706/46 |
| 6,067,535 * | 5/2000 | Hobson et al. | 706/10 |
| 6,076,082 * | 6/2000 | Kindo | 706/12 |
| 6,202,058 * | 3/2001 | Rose et al. | 706/45 |

OTHER PUBLICATIONS

Syed et al, "A study of support vectors on model independent example selection", KDD ACM pp. 272–276, Jul. 1999.*

Merhav et al, "Universal sequential learning and decision from individual data sequence", COLT ACM pp. 413–427, Aug. 1992.*

Blum et al, "On line learning and metrical task system problem", COLT ACM pp. 45–53, Jun. 1997.*

M. Ojala, "Filtered Information and Intelligent Agent Software," Business Information Alert, vol. 8, No. 6, Jun. 1995.*

T. Nomura et al., "A method for retrieval of a target still image by selecting similar and dissimilar images", In Proceedings of the 45th National Conference, Information Processing Society of Japan, No. 4, p. 4–204 to 4–.

B. Sheth et al., "Evolving Agents For Personalized Information Filtering", In Proceedings of the 9th Conference on Artificial Intelligence for Applications, IEEE Computer Society Press, p. 345–352, 1993.

"Information Extraction From Electronic Mail" A. Kawai et al.; Information Processing Society Technical Report, Natural Language Processing 101–8 (1994, 5, 27); pp., 57–64 (w/partial English translation).

T. Nomura et al., "A method for retrieval of a target still image by selecting similar and dissimilar images", In Proceedings of the 45th National Conference, Information Proceessing Society of Japan, No. 4, pp. 4–204 to 4–.

B. Sheth et al., "Evolving Agents For Personalized Information Filtering", In Proceedings of the 9th Conference on Artificial Intelligence for Applications, IEEE Computer Society Press, pp. 345–352, 1993.

* cited by examiner

INFORMATION FILTERING METHOD AND APPARATUS FOR PREFERENTIALLY TAKING OUT INFORMATION HAVING A HIGH NECESSITY

This application is a Divisional of application Ser. No. 08/707,565, filed Sep. 4, 1996.

BACKGROUND OF THE INVENTION

1. Field of the Invention

The present invention relates to an information filtering apparatus and an information filtering method for easily taking out necessary information from an information communication network or a storing apparatus in which pieces of information are transmitted by using electrons or light as a transmission medium.

2. Description of the Related Art

An information filtering apparatus has been recently desired as a technique corresponding to an information communication network developed on a large scale and the considerable increase of an amount of communication while an information communication has been developed. That is, because a volume of information capable to be accessed by an individual is larger than that capable to be processed by the individual, the individual cannot find out necessary information from a large volume of information capable to be accessed by the individual. Therefore, an information filtering apparatus and an information filtering method for easily taking out necessary information from a large volume of information is required.

In a conventional information filtering apparatus, for example, a keyword logical equation used for a patent retrieval is well-known. That is, a large number of patent information of which the number ranges from hundreds of thousands to millions are filtered according to the keyword logical equation.

3. Problems to be Solved by the Invention

However, in the conventional information filtering apparatus using a keyword logical equation, because a user is required to strictly set a keyword logical equation, the user is required to sufficiently and skillfully know types of a large volume of filed information (for example, a method for determining keywords for the information on some condition) or a system configuration for a large volume of information (for example, a system for keywords). Therefore, there is a first drawback that a beginner cannot perform an information filtering with a high precision.

Also, when the user performs an information filtering, the user can only estimate that a piece of information obtained in the information filtering is fit for a keyword logical equation. Therefore, even though the information is fit for a keyword logical equation, there is a case that the information is not a piece of required information. That is, there is a second drawback that the user cannot easily take out information having a high necessity for the user from a large volume of information in the information filtering.

SUMMARY OF THE INVENTION

An object of the present invention is to provide, with due consideration to the drawbacks of such a conventional information filtering apparatus, an information filtering method and an information filtering apparatus in which an information filtering is performed with a high precision by an beginner and information having a high necessity for a user is easily retrieved from a large volume of information.

The object is achieved by the provision of an information filtering apparatus, comprising:

information indicating means for indicating pieces of learning information;

learning information control means for receiving a plurality of teaching signals respectively indicating whether one piece of learning information indicated by the information indicating means is necessary or unnecessary and generating pieces of teaching data respectively composed of one piece of learning information and one teaching signal corresponding to the piece of learning information;

learning means for performing a learning operation for each of the pieces of teaching data generated by the learning information control means to produce records indicating whether each piece of learning information indicated by the information indicating means is judged to be necessary or unnecessary; and information filtering means for filtering pieces of information data according to the records produced by the learning means to arrange the pieces of information data in order of necessity.

In the above configuration, a user judges whether each piece of learning information indicated by the information indicating means is necessary or unnecessary. That is, in cases where one piece of learning information is necessary for the user, a teaching signal indicating that the piece of learning information is necessary is received by the learning information control means. In contrast, in cases where one piece of learning information is unnecessary for the user, a teaching signal indicating that the piece of learning information is unnecessary is received by the learning information control means. Thereafter, a teaching data composed of one piece of learning information and one teaching signal is produced for each of the learning information. Thereafter, a learning operation is performed for each of the teaching data in the learning unit, and records indicating whether each piece of learning information indicated by the information indicating means is a piece of necessary information or a piece of unnecessary information are produced. Thereafter, pieces of information data are filtered according to the records in the information filtering means to arrange the information data in order of necessity.

Accordingly, because the pieces of information data can be indicated to the user in order of necessity, information having a high necessity for a user can be easily retrieved from a large volume of information.

Also, the object is achieved by the provision of an information filtering method, comprising the steps of:

indicating pieces of learning information on an indicating unit;

receiving a plurality of teaching signals respectively indicating whether one piece of learning information indicated on the indicating unit is necessary or unnecessary;

generating pieces of teaching data respectively composed of one piece of learning information and one teaching signal corresponding to the piece of learning information;

performing a learning operation for each of the pieces of teaching data to produce records indicating whether each piece of learning information indicated by the information indicating means is judged to be necessary or unnecessary; and filtering pieces of information data according to the records to arrange the pieces of information data in order of necessity.

In the above steps, information having a high necessity for a user can be easily retrieved from a large volume of information, in the same manner as in the information filtering apparatus.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of an information filtering method and an information filtering apparatus according to the present invention are described with reference to drawings.

First Embodiment

Figure 1:
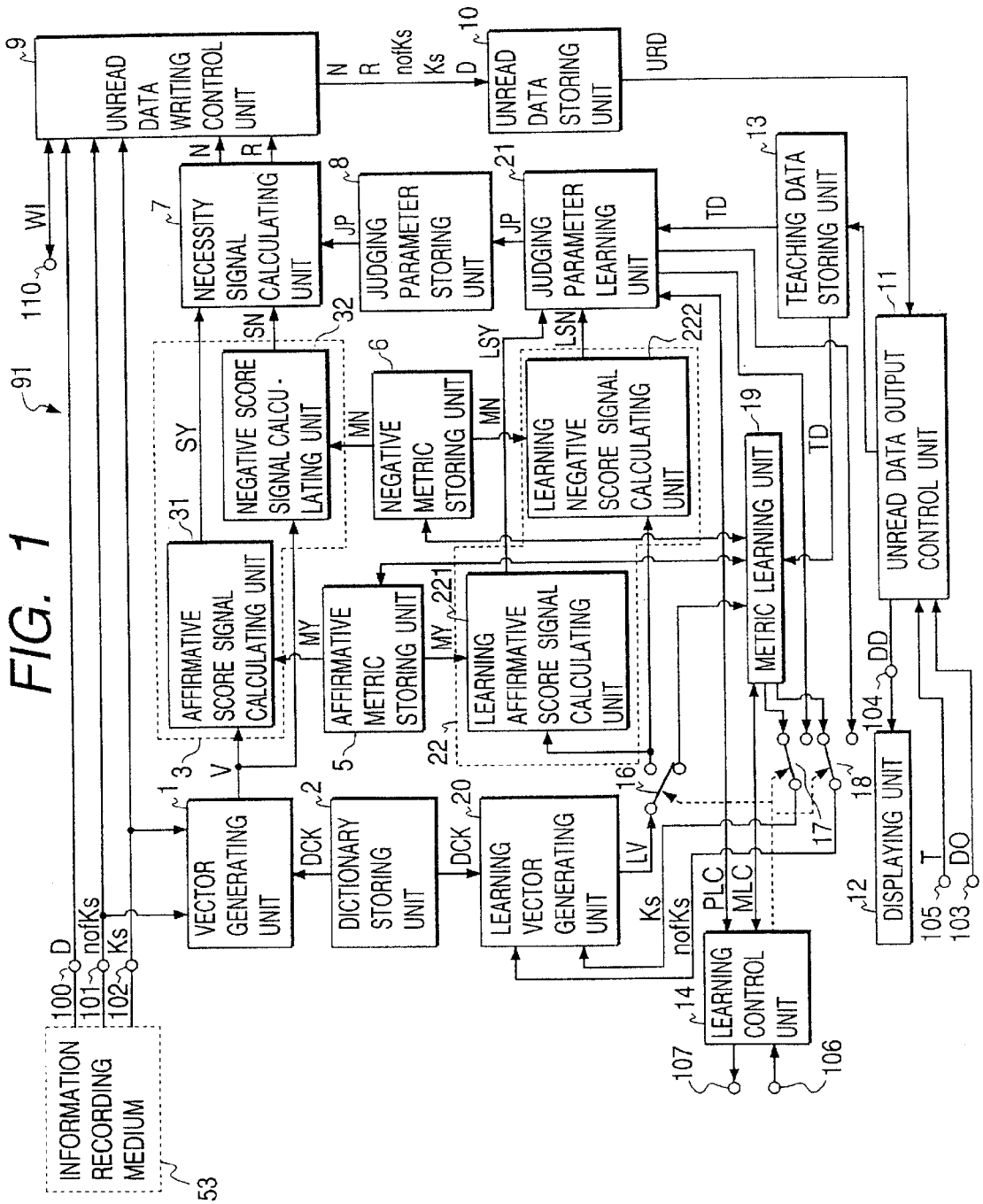
FIG. 1 is a block diagram of an information filtering apparatus according to a first embodiment of the present invention.
Figure 2:
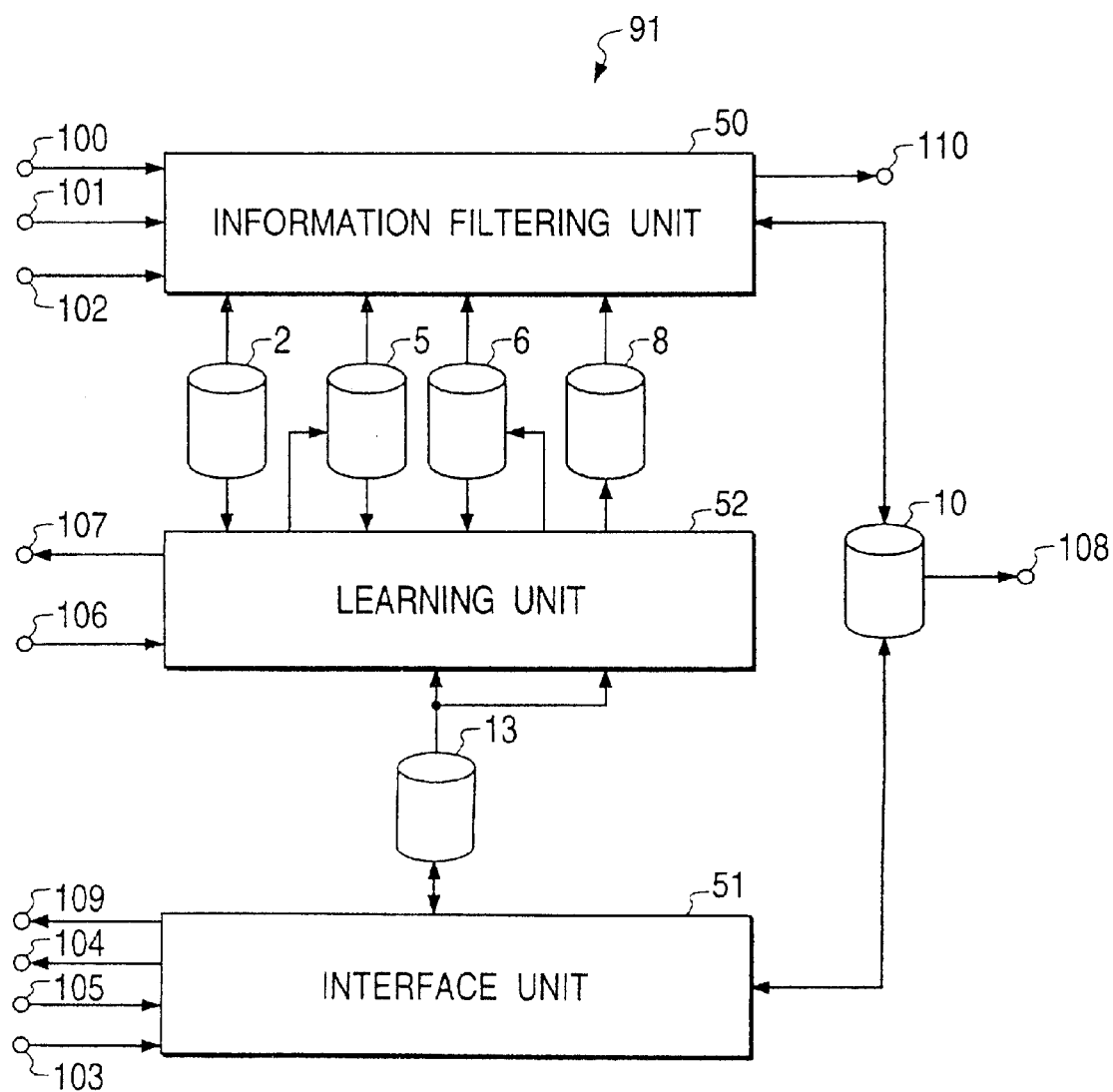
FIG. 2 is a functional block diagram of the information filtering apparatus shown in FIG. 2.

FIG. 1 is a block diagram of an information filtering apparatus according to a first embodiment of the present invention, and FIG. 2 is a functional block diagram of the information filtering apparatus.

A fundamental concept of the present invention is described with reference to FIG. 2.

An information filtering apparatus 91 comprises a plurality of storing units 2,5,6 and 8 for storing various records indicating which of pieces of learning information was required by a user in the past, an information filtering unit 50 for filtering pieces of information transmitted from an information communication network or an information recording medium 53, in which electrons or light are used as a medium, according to the records stored in the storing units 2,5,6 and 8, an unread data storing unit 10 for storing pieces of unread information which each have not been read by the user and have been filtered by the information filtering unit 50, an interface unit 51 formed by a display or the like for visually showing the unread information, and a learning unit 52 for performing the learning to obtain the records relating to the learning information.

In the above configuration, an operation in the information filtering apparatus 91 is described. In this case, the operation is described on the assumption that various records indicating pieces of learning information required by a user in the past have been learned by the learning unit 52. Also, one or more keywords are attached to each of pieces of information such as learning information and unread information. Each of the keywords is a part of word included in the corresponding information, a word included in the corresponding information or an additional word representing the corresponding information.

When a piece of new information is input to the information filtering unit 50, various records of pieces of learning information required by a user in the past are read out from the storing units 2,5,6 and 8 to the information filtering unit 50, a necessity degree for the new information is calculated by comparing the learning information and the new information, and a necessity signal indicating a quantitative estimation of the necessity degree for the new information is obtained in the information filtering unit 50.

Thereafter, the new information is written in the unread data storing unit 10 as a piece of unread information on condition that the new information and pieces of unread information already stored in the unit 10 are arranged in order of magnitude of the necessity degrees indicated by the necessity signals.

When the user desires to check the unread information, the unread information stored in the unread data storing unit 10 are indicated one after another in the interface unit 51 in order of magnitude of the necessity degrees, for example, by showing the unread information on a display. In this case, a teaching signal indicating whether or not one piece of unread information shown to the user in the interface unit 51 is necessary for the user is input to the interface unit 51 by the user, a set of the teaching signal and the corresponding unread information is transferred from the interface unit 51 to the learning unit 52. The teaching signal is input for each of pieces of unread information selected by the user. Also, each teaching signal is input to heighten a learning faculty of the learning unit 52 for the records of the learning information required by the user, so that the input of the teaching signal is not required in cases where the learning faculty of the learning unit 52 has been already heightened to a sufficient degree.

Thereafter, the records of the learning information stored in the storing units 2,5,6 and 8 are rewritten according to one or more sets of the teaching signals and the corresponding unread information.

Accordingly, the records of the learning information adapted to the requirement of the user can be prepared in the information filtering apparatus 91 by performing the learning for the unread information in the learning unit 52 to heighten the learning faculty of the learning unit 52, and one or more pieces of particular unread information required by the user can be preferentially indicated by the interface unit 51 because the unread information stored in the unread data storing unit 10 are indicated in the order of the necessity degree.

Also, because information required by the user cannot be judged by the learning unit 52 in an initial condition in which any learning operation has been not yet performed, each time a piece of new information which is input to the information filtering unit 50 and is stored as a piece of unread information in the unread data storing unit 10 is indicated by the interface unit 51, the input of the teaching signal is required of the user to perform the learning of the records of the learning information. However, the records of the learning information are gradually adapted to the requirement of the user while repeating the learning, and information required by the user can be preferentially indicated by the interface unit 51.

Here, the preferential indication of information is described in detail. When a population A of pieces of information is searched for pieces of required information relating to a particular keyword, a retrieved set B of pieces of particular information relating to the particular keyword is obtained. In this case, the retrieved set B does not necessarily agree with a required set C of the required information. That is, the particular information existing in the retrieved set B are not necessarily required by the user. Also, even though the retrieved set B agrees with the required set C and all pieces of particular information of the retrieved set B are required by the user, a necessity (or priority) order exists in the particular information. Therefore, the preferential indication of information denotes that pieces of information required by the user are indicated one after another in a necessity order.

An important point in the present invention is how a necessity signal (or a teaching signal indicating the necessity of information) is calculated. The necessity signal is conceptually calculated as follows.

One or more keywords are attached to each piece of information input to the information filtering unit 50. A keyword set A of a plurality of first keywords which each are attached to one piece of necessary information required by a user at a high probability is defined, a keyword set B of a plurality of second keywords which each are attached to one piece of unnecessary information not required by the user at a high probability is defined, and a keyword set C of a plurality of third keywords each of which is not attached to either the necessary information or the unnecessary information is defined. In this case, a positive value is given to each of the first keywords belonging to the keyword set A, a negative value is given to each of the second keywords belonging to the keyword set B, and a zero value is given to each of the third keywords belonging to the keyword set C. Thereafter, it is judged that each of one or more keywords attached to one piece of new information input to the information filtering unit 50 belongs to which of the keyword sets A, B and C, and values allocated to the keywords are summed to produced a summed keyword value.

Therefore, the summed keyword value for information (judged by the user to be necessary at a high probability) to which many keywords belonging to the keyword set A are attached is a high positive value, the summed keyword value for information (not judged as unnecessary data by the user at a high probability) to which many keywords belonging to the keyword set B are attached is a negative and high absolute value, and the keywords attached each of pieces of information can be converted to the summed keyword value.

Accordingly, a necessity degree of each piece of information judged by the user to be necessary can be predicted by using the summed keyword value. In the present invention, the allocation of values to one or more keywords (including keywords simultaneously occurred) which are attached to unread information indicated in the interface unit 51 is automatically performed according to the unread information and the estimation of a necessity degree or an unnecessity degree performed by the user for the unread information, a necessity signal corresponding to the unread information is calculated with a high precision, and pieces of unread information are arranged in order of necessity with a high precision.

In a first embodiment, a plurality of keywords attached to each piece of information are converted to a vector V composed of elements V(1), V(2), . . . ,V(nofDCK), an auto-correlation matrix My of the vector is calculated in cases where the information is judged by the user to be necessary, and a length SY of the vector V is calculated as follows.

$$SY = \sum_i \sum_j My(i, j) * V(i) * V(j)$$

Also, another auto-correlation matrix Mn of the vector V is calculated in cases where the information is judged by the user to be unnecessary, and a length SN of the vector V is calculated as follows.

$$SN = \sum_i \sum_j Mn(i, j) * V(i) * V(j)$$

Here, the auto-correlation matrix My produced from the keywords attached to the necessary information is called an affirmative metric signal MY, the auto-correlation matrix Mn produced from the keywords attached to the unnecessary information is called a negative metric signal MN, the length SY is called an affirmative score signal, and the length SN is called a negative score signal.

The length SY of the vector V is a high positive value in cases where a major part of a plurality of keywords corresponding to the vector V agree with keywords attached to the necessary information, and the length SY of the vector V is close to a zero value in cases where a major part of a plurality of keywords corresponding to the vector V do not agree with keywords attached to the necessary information. Therefore, the affirmative score signal SY is useful to calculate the necessity signal.

The length SN of the vector V is a high positive value in cases where a major part of a plurality of keywords corresponding to the vector v agree with keywords attached to the unnecessary information, and the length SN of the vector V is close to a zero value in cases where a major part of a plurality of keywords corresponding to the vector V do not agree with keywords attached to the unnecessary information.

Next, the first embodiment is described with reference to FIG. 1 in detail.

A block of the information filtering unit 50 comprises a vector generating unit 1 for converting a plurality of keywords (respectively formed by a character stream including a classification code) attached to each piece of information into a vector, a code dictionary storing unit 2 for storing a plurality of code dictionary signals DCK used to convert a plurality of character streams such as keywords into a vector in the vector generating unit 1, an affirmative score signal calculating unit 31 of a score calculating unit 3 for calculating the affirmative score signal SY indicating a type of score by using the vector generated in the vector generating unit 1 and the affirmative metric signal MY indicating the records of the necessary information required by the user, a negative score signal calculating unit 32 of the score calculating unit 3 for calculating the negative score signal SN indicating a type of score by using the vector generated in the vector generating unit 1 and the negative metric signal MN expressing the records of the unnecessary information not required by the user, a necessity signal calculating unit 7 for calculating the necessity signal N sufficiently reflecting a necessity degree of the information from the affirmative score signal SY and the negative score signal SN calculated by the score calculating unit 3, and an unread data writing control unit 9 for rearranging the necessity signals calculated by the necessity signal calculating unit 7 in order of levels of the necessity signals.

In the code dictionary storing unit 2, the code dictionary signals DCK are a code book having a plurality of corresponding tables, of which the number is nofDCK, for respectively converting a character stream W such as a keyword into a numeral C, and the corresponding tables of the code dictionary signals DCK are expressed as follows.

$$DCK(1) = (W(1), C(1))$$
$$\vdots \quad \vdots$$
$$DCK(nofDCK) = (W(nofDCK), c(nofDCK))$$

In the vector generating unit 1, a keyword number signal nofKs and a keyword group signal $Ks=(K(1), \ldots, K(nofKs))$ composed of a plurality of keywords K of which the number is nofKs are received, and the keyword group signal Ks is converted into a vector signal V by using the keyword number signal nofKs.

The affirmative metric signal MY formed by a (nofDCK rows*nofDCK columns) matrix is stored in an affirmative metric storing unit 5, and the negative metric signal MN formed by a (nofDCK rows*nofDCK columns) matrix is stored in a negative metric storing unit 6.

A judging parameter signal JP is stored in a judging parameter storing unit 8.

In the necessity signal calculating unit 7, the affirmative score signal SY and the negative score signal SN are received from the score calculating unit 3, the judging parameter signal JP is read out from the judging parameter signal JP, and the necessity signal N and a reliability signal R are calculated by using the affirmative score signal SY, the negative score signal SN and the judging parameter signal JP.

In the unread data writing control unit 9, a writing operation for writing information data D denoting a body of information, the keyword number signal nofKs, the keyword group signal Ks, the necessity signal N and the reliability signal R in the unread data storing unit 10 is controlled.

In the unread data storing unit 10, a plurality of unread data signal URD, of which the number is nofURD at the maximum, respectively composed of the information data D, the keyword number signal nofKs, the keyword group signal Ks, the necessity signal N and the reliability signal R are stored under the control of the unread data writing control unit 9. The unread data signal URD are expressed as follows.

$$URD(1) = (N(1), R(1), nofKs(1), Ks(1), D(1))$$
$$\vdots \quad \vdots$$
$$URD(nofURD) = (N(nofURD), R(nofURD), nofKs(nofURD),$$
$$Ks(nofURD), D(nofURD))$$

Also, a plurality of teaching data signals TD, of which the number is nofTD at the maximum, are stored in a teaching data storing unit 13. The teaching data signals TD are expressed as follows.

$$TD(1) = (T(1), Tnofk(1), TKs(1))$$
$$\vdots \quad \vdots$$
$$TD(nofTD) = (T(nofTD), Tnofk(nofTD), TKs(nofTD))$$

Here, a symbol T denotes a teaching signal, a symbol Tnofk is used for the keyword number signal nofKs, and a symbol Tks is used for the keyword group signal Ks. Each keyword group signal $TKs(i)=(TK(1), \ldots, TK(nofKs))$ is composed of a plurality of keywords TK.

Next, the configuration of the interface unit 51 is described.

The interface unit 51 comprises an unread data output control unit 11 for reading out the unread data signal URD(1) from the unread data storing unit 10 according to a control signal DO received from the outside, outputting a display signal DD for the unread data signal URD(1) to the outside, receiving a teaching signal T(1) indicating whether or not the display signal DD is necessary for the user from the user, and writing the teaching signal T(1), the unread data signal URD(1), the keyword number signal nofKs(1) and the keyword group signal Ks(1) in the teaching data storing unit 13 as the teaching data signal TD(1).

Next, the configuration of the learning unit 52 is described.

The learning unit 52 comprises a metric learning unit 19 for revising the affirmative metric signal MY stored in the affirmative metric storing unit 5 and the negative metric signal MN stored in the negative metric storing unit 6 according to the teaching data signal TD stored in the teaching data storing unit 13, a learning vector generating unit 20 for converting a plurality of keywords attached to a piece of information into a learning vector LV in the same manner as in the vector generating unit 1, a learning affirmative score signal calculating unit 221 of a learning score calculating unit 22 for calculating a learning affirmative score signal LSY according to the learning vector LV generated in the learning vector generating unit 20, a learning negative score signal calculating unit 222 of the learning score calculating unit 22 for calculating a learning negative score signal LSN according to the learning vector LV generated in the learning vector generating unit 20, a judging parameter learning unit 21 for rewriting the judging parameter signal JP stored in the judging parameter storing unit 8 according to the teaching data TD, the learning affirmative score signal LSY and the learning negative score signal LSN, and a learning control unit 14 for controlling a plurality of switches 16, 17 and 18, the metric learning unit 19, the learning vector generating unit 20, the judging parameter learning unit 21 and the learning score calculating unit 22.

In the metric learning unit 19, an auto-correlation matrix of the learning vector LV generated in the learning vector generating unit 20 is calculated, and the affirmative metric signal MY and the negative metric signal MN are revised according to the auto-correlation matrix of the learning vector LV.

In the above configuration of the information filtering apparatus 91, an operation performed in each of the units 50, 51 and 52 is described.

An example of a preferred initial condition of the information filtering apparatus 91 is as follows. The affirmative metric signal MY and the negative metric signal MN are respectively set to a (nofDCK*nofDCK) zero matrix, all necessity signals N(i) (i=1,2, . . . ,nofURD) of the unread data signal URD of the unread data storing unit 10 is set to a minimum value Vmin expressible by a hardware used for the unread data storing unit 10, and all teaching signals T(j) of the teaching data signals TD(j) stored in the teaching data storing unit 13 are set to −1.

An operation of the information filtering unit 50 is described.

A piece of information data D is input from an information data input terminal 100 to the unread data writing control unit 9, a keyword group signal Ks=(K(1), . . . , K(nofKs)) composed of a plurality of keywords K attached to the information data D is input from a keyword input terminal 102 to the vector generating unit 1 and the unread data writing control unit 9, and a keyword number signal nofKs indicating the number of keywords attached to the information data D is input from a keyword number signal input terminal 101 to the vector generating unit 1 and the unread data writing control unit 9.

Thereafter, the keyword group signal Ks having a group of character streams is converted into a vector signal V according to the code dictionary signals DCK. Therefore, similarity in the keyword group signal Ks can be calculated as a length (or metric) of the vector signal V.

Figure 3:
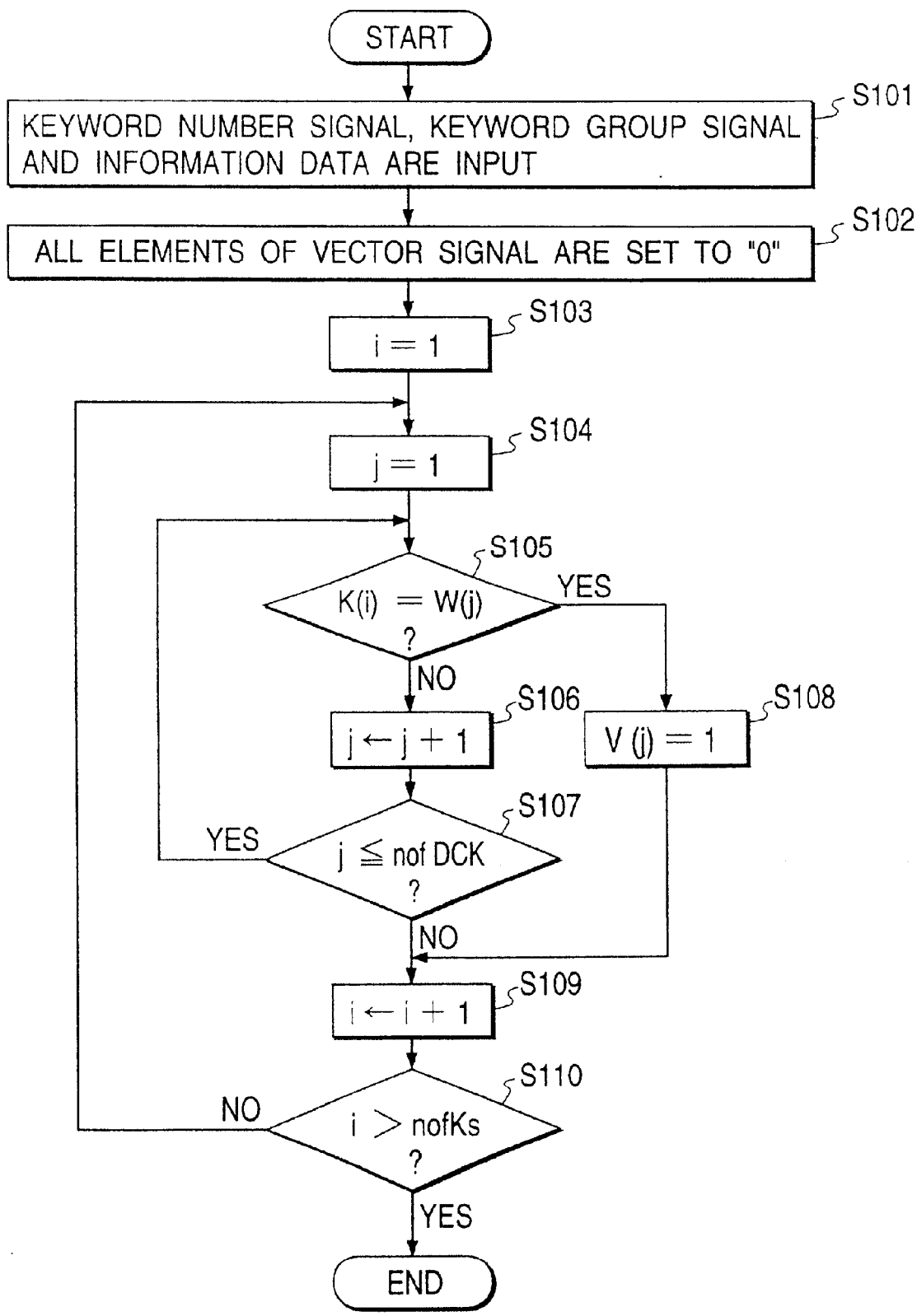
FIG. 3 is a flow chart showing an operation of a vector generating unit of the information filtering apparatus.

An operation of the vector generating unit 1 is described with reference to FIG. 3. FIG. 3 is a flow chart showing an operation of the vector generating unit 1.

When the keyword number signal nofKs and the keyword group signal Ks are received in the vector generating unit 1 (step S101), a vector signal V=(V(1), V(2), . . . , V(nofDCK)) is set to an initial condition (0,0, . . . ,0) (step S102), and a keyword counter value i is set to 1 (step S103). Thereafter, a dictionary counter value j is set to 1 (step S104).

Thereafter, a code dictionary signal DCK(j) indicated by the dictionary counter value j is read out from the dictionary storing unit 2, and it is judged whether or not a character stream W(j) of the code dictionary signal DCK(j) agrees with an i-th keyword K(i) of the keyword group signal Ks (step S105). In case of K(i)≠W(j), the dictionary counter value j is incremented by 1 (step S106). Thereafter, in cases where the dictionary counter value j is equal to or lower than the number nofDCK of code dictionary signals (step S107), because a code dictionary signal DCK(j) is stored in the dictionary storing unit 2, the steps S105 and S106 are repeated. The repetition of the steps S105 to S107 is performed until K(i)=W(j) is satisfied in the step S105 or j>nofDCK is satisfied in the step S107.

In cases where a character stream w(j) of the code dictionary signal DCK(j) agreeing with the keyword K(i) of the keyword group signal Ks is found out in the step S105, a j-th element V(j) of the vector signal V is set to 1 (step S108). Thereafter, the procedure proceeds to a step S109. Also, in cases where any character stream W(j) of the code dictionary signal DCK(j) agreeing with the keyword K(i) of the keyword group signal Ks is not found out in the step S105 and j>nofDCK is satisfied in the step S107, the procedure proceeds to the step S109.

Thereafter, the keyword counter value i is incremented by 1 (step S109), and the steps S105 to S108 are repeated on condition that the keyword counter value i equal to or lower than the keyword number signal nofKs. In cases where i>nofKs is satisfied (step S110), because K(i) does not exist, the operation of the vector generating unit 1 for the dictionary data D is finished.

Therefore, the keyword group signal Ks composed of a plurality of character streams can be converted into a vector signal V composed of nofDCK elements each of which is coded to "0" or "1".

Thereafter, the vector signal V is received in the affirmative score signal calculating unit 31. In the unit 31, an affirmative metric signal MY is read out from the affirmative metric storing unit 5, and an affirmative score signal SY is calculated as follows.

$$SY = \sum_{i=0}^{NofDCK-1} \sum_{j=0}^{nofDCK-1} MY(i, j) * V(i) * V(j)$$

A level of the affirmative score signal SY becomes a high positive value in cases where a major part of the keywords K of the keyword group signal Ks agree with keywords attached to necessary information required by the user in the past.

Also, the vector signal V is received in the negative score signal calculating unit 32. In the unit 32, a negative metric signal MN is read out from the negative metric storing unit 6, and a negative score signal SN is calculated as follows.

$$SN = \sum_{i=0}^{NofDCK-1} \sum_{j=0}^{nofDCK-1} MN(i, j) * V(i) * V(j)$$

A level of the negative score signal SN becomes a high positive value in cases where a major part of the keywords K of the keyword group signal Ks agree with keywords which are attached to information data judged as unnecessary data by the user in the past.

The affirmative metric signal MY and the negative metric signal MN are determined according to the keyword group signal KS and a response (or teaching signal T) of the user, as is described later.

Figure 4:
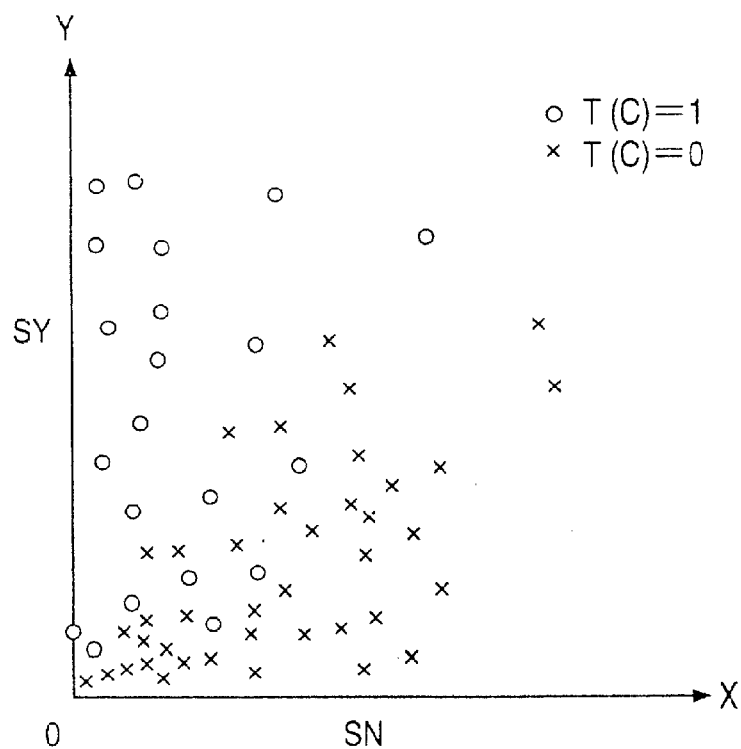
FIG. 4 shows the distribution of a plurality of sets (SN,SY) for negative score signals SN and affirmative score signals SY in a two-dimensional coordinate system.
Figure 5:
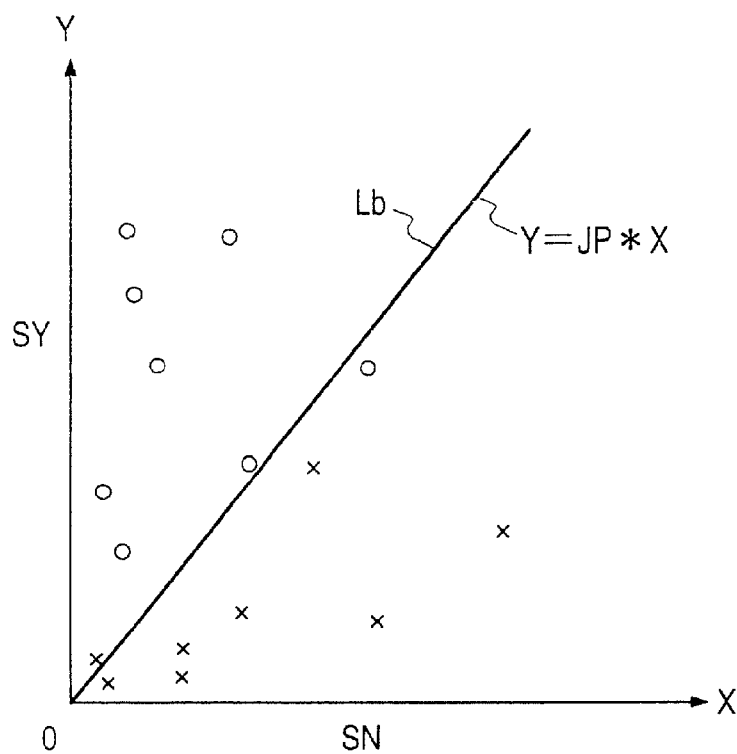
FIG. 5 shows a boundary line Lb separating necessary information data from unnecessary information data corresponding to the sets (SN,SY) to determine an inclination JP in a judging parameter learning unit.

As shown in FIG. 4, in cases where a two-dimensional coordinate system in which a level of the negative score signal SN is indicated as a value in an X axis and a level of the affirmative score signal SY is indicated as a value in a Y axis is used, a plurality of sets (SN,SY) corresponding to a plurality of pieces of information data D input to the apparatus 91 are distributed in the two-dimensional coordinate system. In this case, a plurality of sets (SN,SY) corresponding to pieces of necessary information data D required by the user in the past are mainly distributed at an above left region, as is designated by a circle symbol ○. Also, a plurality of sets (SN,SY) corresponding to pieces of information data D judged as unnecessary data by the user in the past are mainly distributed at a below right region, as is designated by a cross symbol ×. Therefore, as shown in FIG. 5, in cases where an inclination JP (JP=Y/X) is appropriately determined in the judging parameter learning unit 21 as the judging parameter signal to draw a boundary line Lb having the inclination JP in the two-dimensional coordinate system, the necessary information data D required by the user can be separated from the unnecessary information data D not required by the user.

Also, as the information data D input to the apparatus 91 is placed at the above left region further from the boundary line Lb, a level of a necessity signal N calculated from the coefficient JP in the necessity signal calculating unit 7 becomes high. That is, as the necessity degree for the information data D is increased, the level of the necessity signal N is heightened. Therefore, in cases where a plurality of pieces of information data D are input to the apparatus 91 one after another, the information data D are arranged and stored in order of necessity degree (that is, in order of magnitude of necessity signals N corresponding to the information data D) in the unread data storing unit 10 under the control of the unread data writing control unit 9, and the information data D are indicated to the user in order of necessity degree under the control of the unread data output control unit 11. Accordingly, the user can efficiently obtain one or more pieces of necessary information data D.

When the affirmative score signal SY output from the affirmative score signal calculating unit 31 and the negative score signal SN output from the negative score signal calculating unit 32 are received in the necessity calculating unit 7, a judging parameter signal JP is read out from the judging parameter storing unit 8 to the unit 7, a necessity signal N is calculated as follows.

$$N = SY - JP*SN$$

Therefore, in cases where a major part of the keywords K of the keyword group signal Ks agree with those attached to necessary information required by the user in the past and the number of keywords K of the keyword group signal Ks agreeing with those attached to the unnecessary information is low, a level of the necessity signal N becomes high. Also, a reliability signal R indicating the reliability of the necessity signal N is calculated in the necessity signal calculating unit 7 as follows.

$$R = JP*SY + SN$$

That is, the reliability signal R relates to a probability that the keywords K of the keyword group signal ks are registered in the code dictionary signals DCK of the dictionary storing unit 2, and the reliability signal R is directed in a direction orthogonal to that of the necessity signal N.

Figure 6:
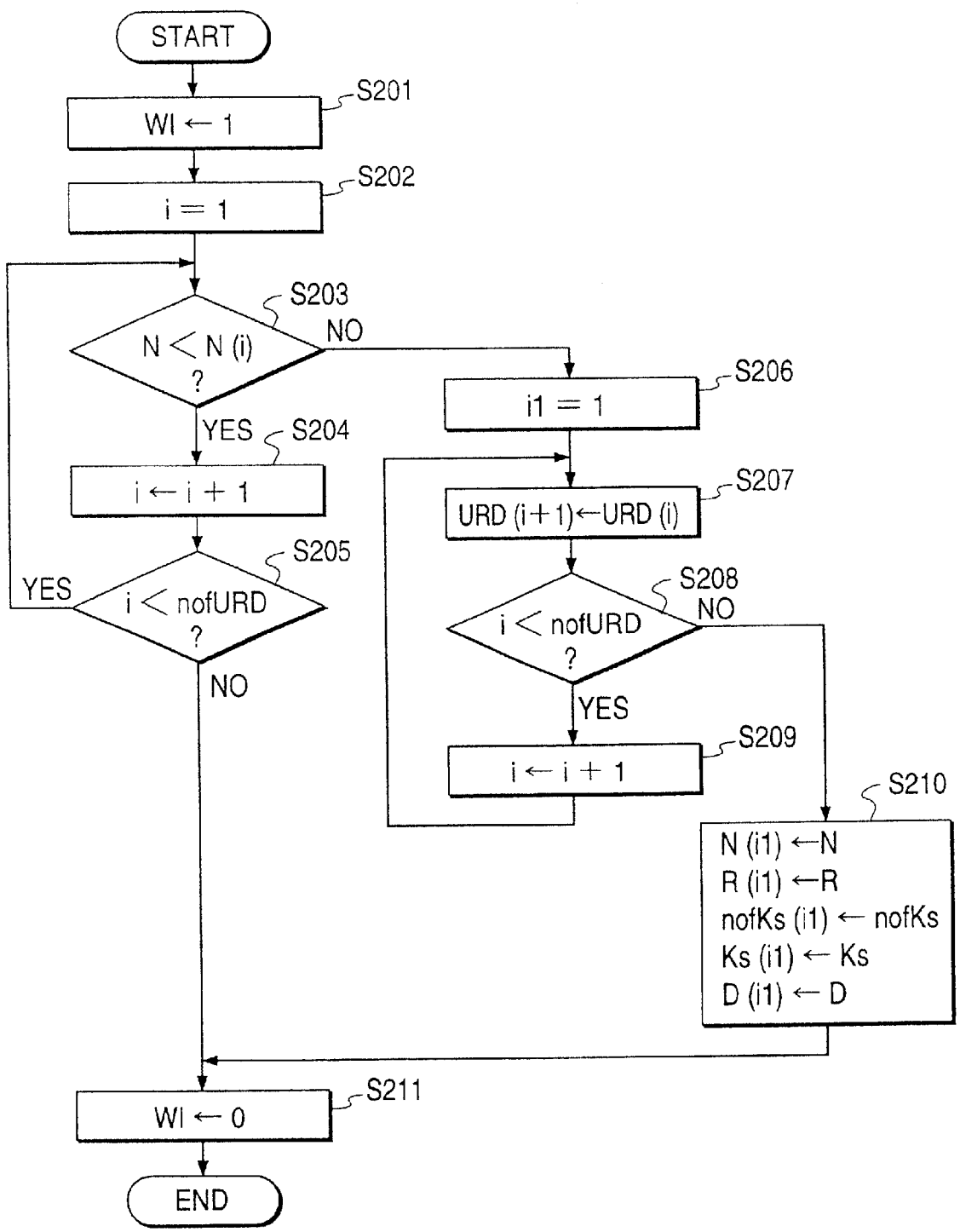
FIG. 6 is a flow chart showing an operation of an unread data writing control unit of the information filtering apparatus.

Next, an operation of the unread data writing control unit 9 is described with reference to FIG. 6. FIG. 6 is a flow chart showing an operation of the unread data writing control unit 9.

When the information data D, the keyword number signal nofKs and the keyword group signal Ks are input from the terminals and the necessity signal N and the reliability signal R are received from the necessity signal calculating unit 7, an unread data processing signal WI output from an unread data unit indicating terminal 110 is changed from "0" to "1" (step S201). Thereafter, a parameter i is set to 1 (step S202), and it is judged whether or not a level of the necessity signal N is lower than that of a necessity signal N(i) of an unread data signal URD(i) read out from the unread data storing unit 10 (step S203). In cases where the level of the necessity signal N is lower than that of the necessity signal N(i), the parameter i is incremented by 1 (step S204). Thereafter, in cases where i<nofURD is satisfied (step S205), because a necessity signal N(i) of an unread data signal URD(i) is stored in the unread data storing unit 10, the steps S203 and S204 are repeated. In contrast, in cases where a necessity signal N(i1) satisfying N≧N(i1) is found out in the step S203, an unread data number i1 is detected as the minimum value i satisfying N≧N(i) (step S206).

Thereafter, each of one or more unread data signals URD(i) (i=i1, . . . ,nofURD) which follow the unread data signal URD(i1-1) and are read out from the unread data storing unit 10 is rewritten to an unread data signal URD (i+1) and is stored in the unread data storing unit 10 (steps S207 to S209). Therefore, an unread data signal URD(i1) does not exist in the unread data storing unit 10. Thereafter, the received signal and data N, R, nofKs, Ks and D are stored in the unread data storing unit 10 as elements of an unread data signal URD(i1) (S210). That is, N(i1) is set to N. R(i1) is set to R, nofKs (i1) is set to nofks, Ks(i1) is set to Ks, and D(i1) is set to D. Thereafter, the unread data processing signal WI is returned to "0" (step S211), and the operation of the unread data writing control unit 9 for the information data D is finished.

Accordingly, in cases where the procedure shown in FIG. 6 is performed each time one piece of information data D is input to the unread data storing unit 10, a plurality of unread data signals URD can be arranged and stored in the unread data storing unit 10 in order of magnitude of necessity signals N. That is, the unread data signals URD satisfying a relationship N(1)≧N(2)≧ . . . ≧N(nofURD-1)≧N (nofURD) are stored in the unread data storing unit 10.

Figure 7:
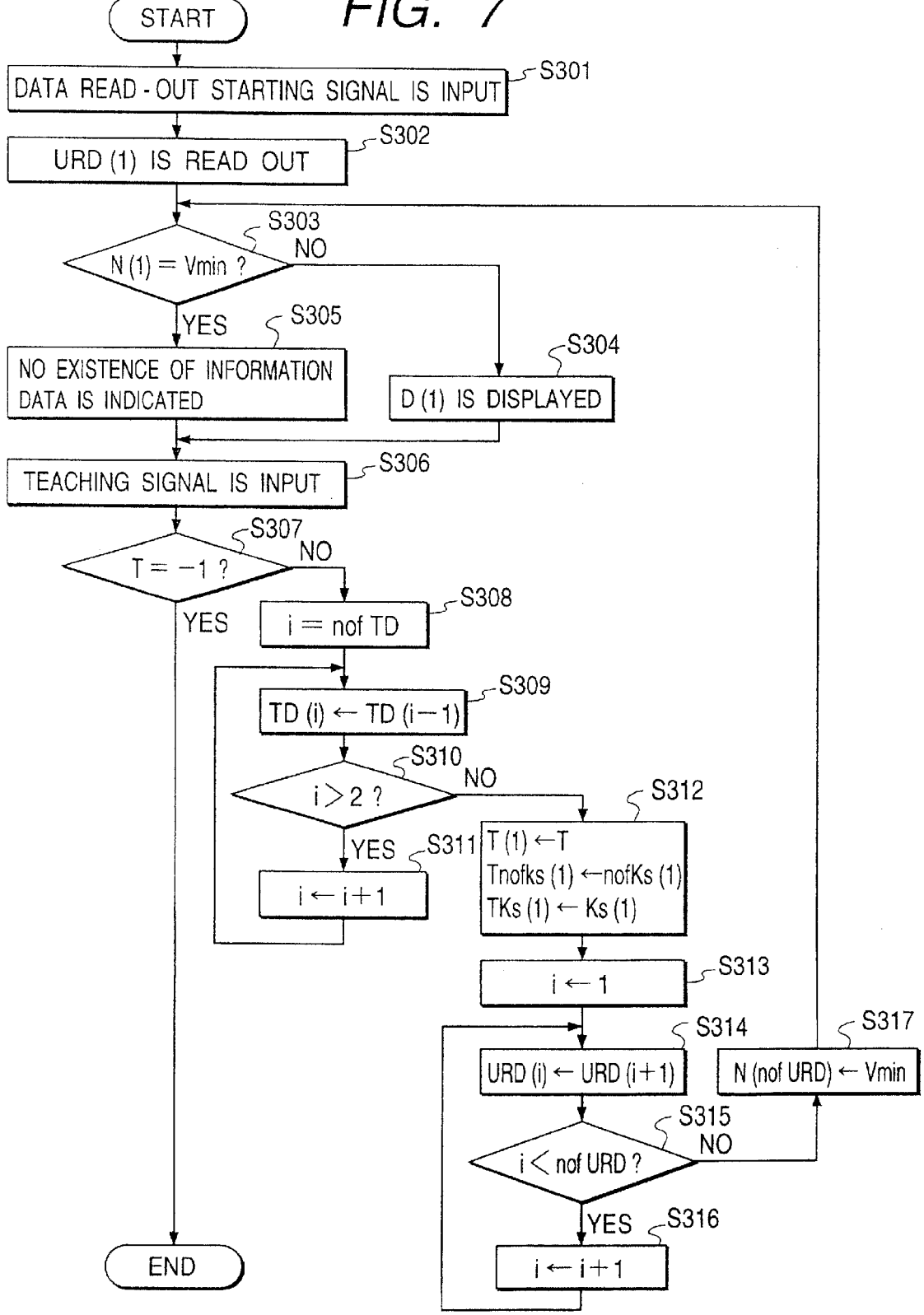
FIG. 7 is a flow chart showing an operation of an interface unit shown in FIG. 2.

Next, an operation of the interface unit 51 in which the unread data signals URD are read out one after another, a teaching signal T is added to each unread data signal URD and teaching data signals TD are generated is described with reference to FIG. 7. FIG. 7 is a flow chart showing an operation of the interface unit 51.

When a data read-out starting signal DO is input from a data read-out starting signal input terminal 103 to the unread data output control unit 11 (step S301), the first unread data signal URD(1) is read out from the unread data storing unit 10 to the unit 11 (step S302), and it is judged whether or not the necessity signal N(1) of the unread data signal URD(1) is higher than the minimum value Vmin initially set (step S303). In cases where the necessity signal N(1) of the unread data signal URD(1) is higher than the minimum value Vmin, the information data D(1) of the unread data signal URD(1) is output to a data display terminal 104 as a display information signal DD to display the information data D(1) on the displaying unit 12 (step S304), and the operation is set to a standby condition. In contrast, in cases where the necessity signal N(1) of the unread data signal URD(1) is equal to or lower than the minimum value Vmin (step S303), a display information signal DD indicating no information data is output to a data display terminal 104 to indicate no existence of information data on the displaying unit 12 (step S305), and the operation is set to a standby condition.

Thereafter, the user observes the display information signal DD displayed on a displaying unit 12, the user inputs a teaching signal T=1 to the apparatus 91 in cases where the information data D indicated by the display information signal DD is necessary for the user, the user inputs a teaching signal T=0 to the apparatus 91 in cases where the information data D indicated by the display information signal DD is not necessary for the user, and the user inputs a teaching signal T=-1 to the apparatus 91 in cases where the user intends to finish the operation of the interface unit 51. Therefore, the teaching signal T is input to the unread data output control unit 11 through a teaching signal input terminal 105 (step S306), and it is judged whether the teaching signal T is 1, 0 or -1 (step S307). In case of the teaching signal T=-1, the operation of the interface unit 51 is finished.

In contrast, in case of the teaching signal T≈−1, each of the teaching data signals TD(i−1) (i=2,3, . . . ,nofTD) already stored in the teaching data storing unit 13 is rewritten to a teaching data signals TD(i) (steps S308 to S311). Therefore, a teaching signal TD(1) is substantially removed from the teaching data storing unit 13. Thereafter, the teaching data T input by the user and the keyword number signal nofKs(1) and the keyword group signal Ks(1) read out from the unread data storing unit 10 are stored in the teaching data storing unit 13 as elements of a teaching signal TD(1) (step S312). That is, T(1) is set to T, TnofKs(1) is set to nofKs(1), and TKs(1) is set to Ks(1). Therefore, the teaching signal T lately input by the user is added to the unread data signal URD(1), and the teaching data signal TD(1) are generated.

Thereafter, the unread data signals URD(i+1) (i=1,2, . . . , (nofURD−1)) stored in the unread data storing unit 10 are rewritten to unread data signals URD(i) (steps S313 to S316) because the unread data signal URD(1) has been already used for the teaching data signal TD(1). Therefore, an unread data signal URD(nofURD) is not stored in the unread data storing unit 10. Thereafter, a necessity signal N(nofURD) is set to the minimum value Vmin as an initial value (step S317). The steps S302 to S317 are repeated.

Next, an operation of the learning unit 52 is described with reference to FIGS. 8 to 10.

Figure 8:
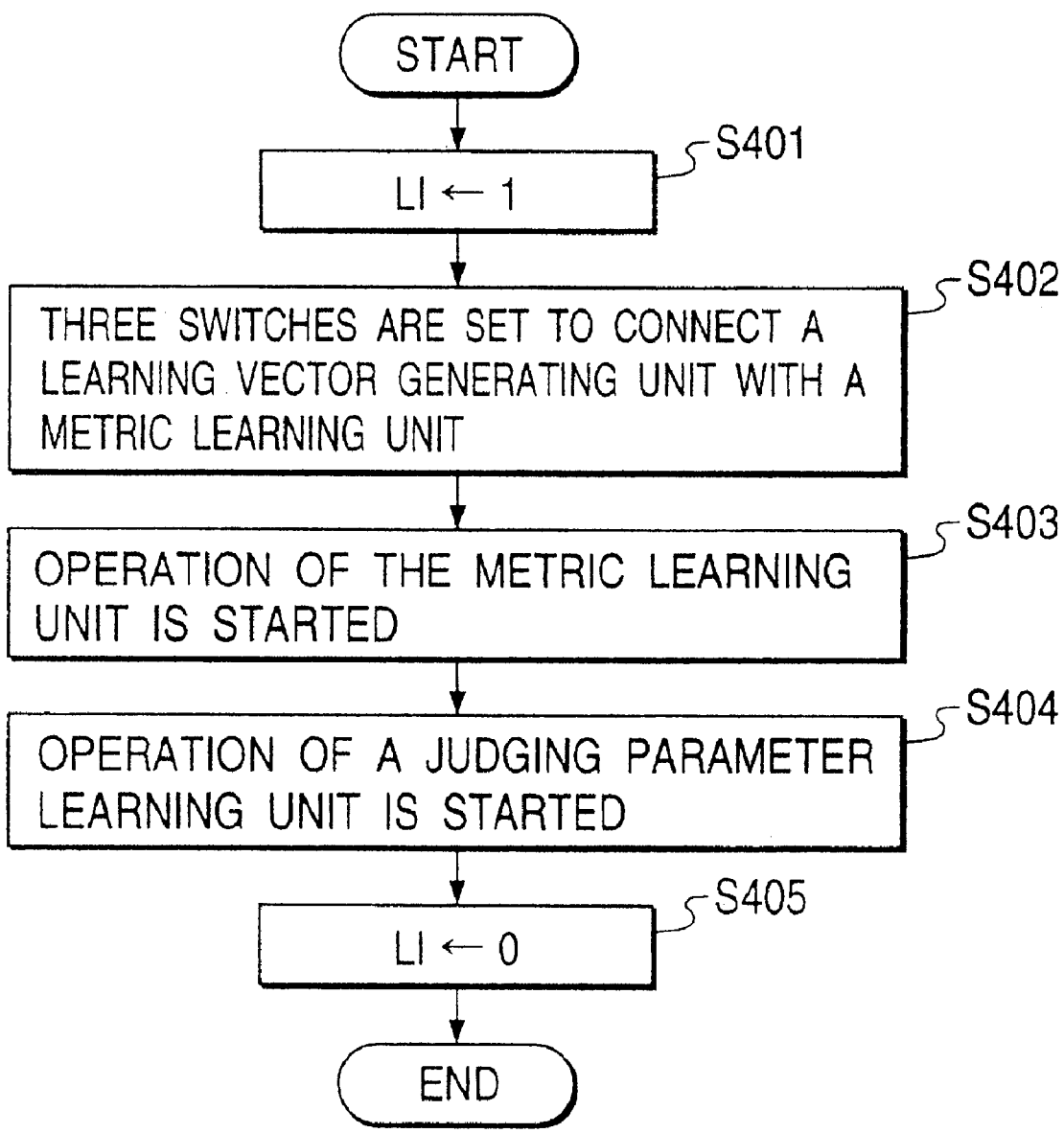
FIG. 8 is a flow chart showing an operation of a learning control unit of the information filtering apparatus.

FIG. 8 is a flow chart showing an operation of the learning control unit 14.

As shown in FIG. 8, when a learning start signal LS is input from a learning start signal input terminal 106, a learning control operation indicating signal LI is changed from "0" to "1" (step S401). Therefore, a condition that the learning unit 52 is operated is indicated. Thereafter, three switches 16 to 18 are set to connect the learning vector generating unit 20 with the metric learning unit 19 (step S402). Thereafter, the operation of the metric learning unit 19 is started (step S403), the operation of the judging parameter learning unit 21 is started (step S404), and the learning control operation indicating signal LI is changed from "1" to "0" (step S405). Therefore, the operation of the learning unit 52 is finished.

Figure 9:
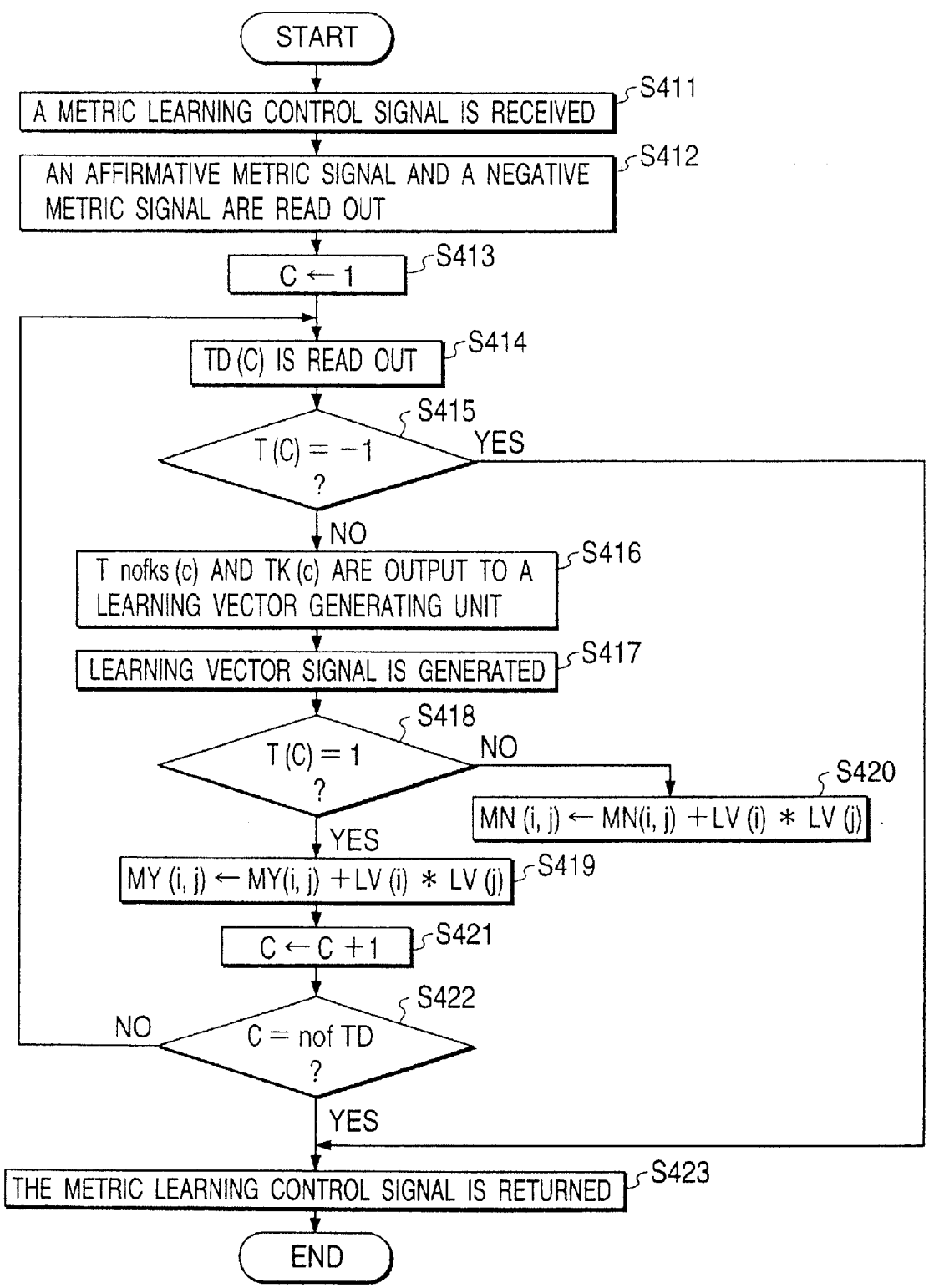
FIG. 9 is a flow chart showing an operation of a metric learning unit of the information filtering apparatus.

FIG. 9 is a flow chart showing an operation of the metric learning unit 19 in which the affirmative metric signal MY and the negative metric signal MN are revised.

When a metric learning control signal MLC is received from the learning control unit 14 (step S411), an affirmative metric signal MY stored in the affirmative metric storing unit 5 and a negative metric signal MN stored in the negative metric storing unit 6 are read out to the metric learning unit 19(step S412). Thereafter, a value C of a teaching data counter is set to 1 in the metric learning unit 19 (step S413). Thereafter, a C-th teaching data signal TD(C) is read out from the teaching data storing unit 13 (step S414), and it is judged whether or not a teaching signal T(C) of the teaching data signal TD(C) is set to "−1" (step S415).

In cases where the teaching signal T(C) is not set to "−1", a keyword number signal TnofKs(C) and a keyword group signal TKs(C) of the teaching data signal TD(C) are output from the metric learning unit 19 to the learning vector generating unit 20 through the switches 17 and 18 (step S416). In the learning vector generating unit 20, a learning vector signal LV(LV(1), LV(2), . . . , LV(nofDCK)) is generated from the keyword number signal TnofKs(C) and the keyword group signal TKS(C) in the same manner as in the vector generating unit 1 (step S417), and the learning vector signal LV is fed to the metric learning unit 19 through the switch 16. Thereafter, in cases where the teaching signal T(C) is set to "1" (step S418), the affirmative metric signal MY stored in the affirmative metric storing unit 5 is revised by using the learning vector signal LV as follows (step S419).

$$MY(i,j)=MY(i,j)+LV(i)*LV(j)\ (i,j=1, 2, \ldots , nofDCK)$$

Therefore, the affirmative metric signal MY corresponding to one or more keywords which are attached to necessary information D required by the user in the past respectively have a high value, and the affirmative score signal SY corresponding to necessary information D required by the user in the past has a high value in the affirmative score signal calculating unit 31.

Also, in cases where the teaching signal T(C) is set to "0" (step S418), the negative metric signal MN stored in the negative metric storing unit 6 is revised by using the learning vector signal LV as follows (step S420).

$$MN(i,j)=MN(i,j)+LV(i)*LV(j)\ (i,j=1, 2, \ldots , nofDCK)$$

Therefore, the negative metric signal MN corresponding to one or more keywords which are attached to information data D judged as unnecessary data by the user in the past respectively have a high value, and the negative score signal SN corresponding to the unnecessary information D has a high value in the negative score signal calculating unit 32.

Thereafter, the value C of the teaching data counter is incremented by 1 (step S421), and the steps S414 to S421 are repeated until the teaching signal T(C) is set to "−1" (step S415) or the value C reaches the maximum number nofTD (step S422). When the operation of the metric learning unit 19 is finished, the metric learning control signal MLC is returned to the learning control unit 14 (step S423).

Accordingly, the relationship between the response (or the teaching signals) of the user and a group of the keywords can reflect on the affirmative metric signal MY and the negative metric signal MN in which the simultaneous occurrence of the keywords is considered, the keyword group signal Ks can be converted into the affirmative score signal SY and the negative score signal SN by using the affirmative metric signal MY and the negative metric signal MN, and symbol information such as keywords can be projected on a two-dimensional metric space. Therefore, a far and near relationship between the keywords can be estimated by an analog scale such as metric. That is, though the alternative judgement of necessity or unnecessity is performed in the prior art to estimate the necessity for each piece of information data, a plurality of pieces of information data can be arranged in order of necessity.

Next, an operation of the judging parameter learning unit 21 is described with reference to FIG. 10.

Figure 10:
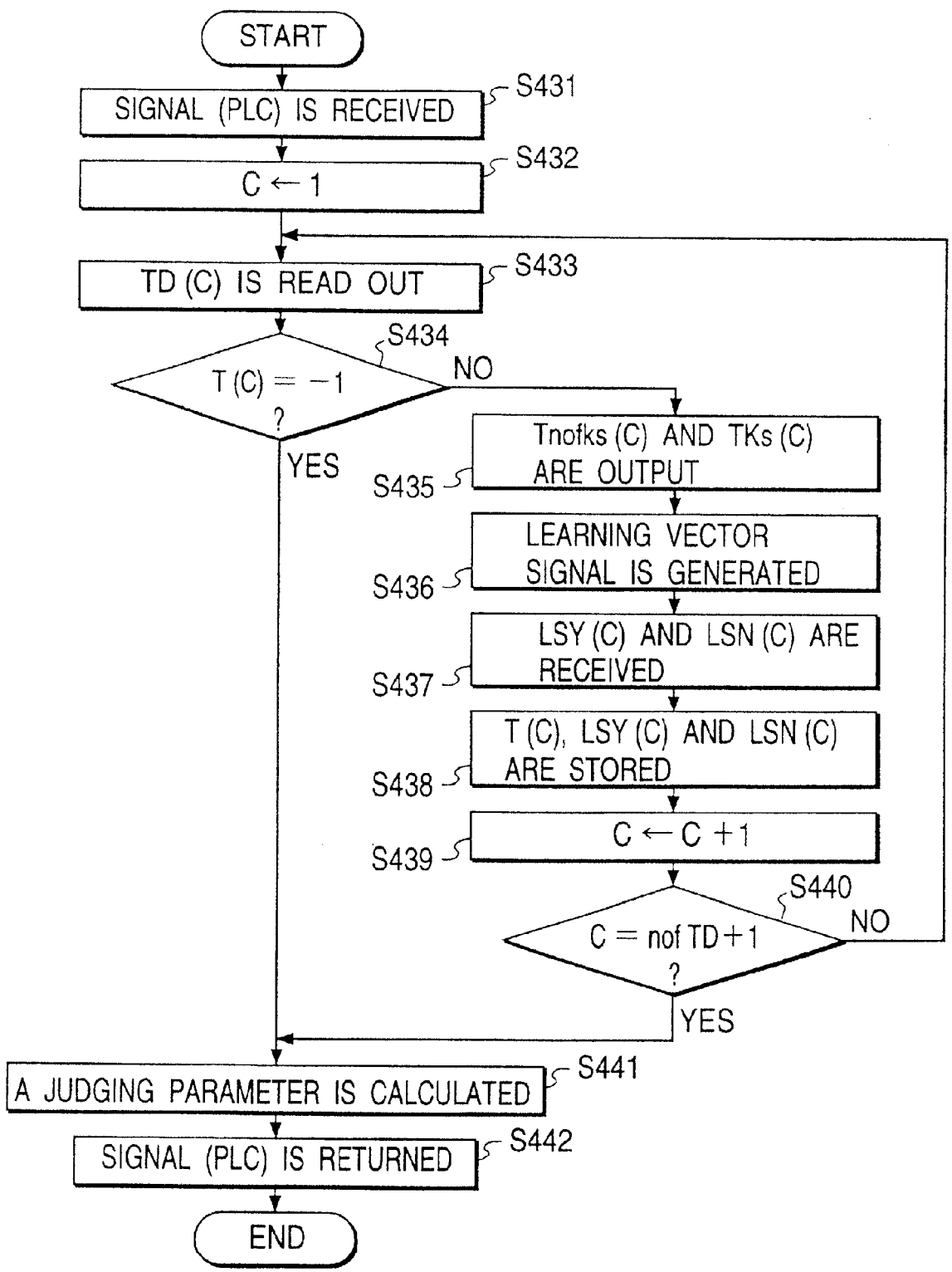
FIG. 10 is a flow chart showing an operation of a judging parameter learning unit of the information filtering apparatus.

FIG. 10 is a flow chart showing an operation of the judging parameter learning unit 21.

As shown in FIG. 10, after the metric learning control signal MLC is received in the learning control unit 14, the switch 16 is changed to connect the score calculating unit 22 with the learning vector-generating unit 20 under the control of the learning control unit 14, the switches 17 and 18 are changed to connect the judging parameter learning unit 21 with the learning vector generating unit 20 under the control of the learning control unit 14, and a judging parameter learning control signal PLC is fed from the learning control unit 14 to the judging parameter learning unit 21.

When the judging parameter learning control signal PLC is received in the judging parameter learning unit 21 (step S431), a value C of a teaching data counter is set to 1 (step S432), a C-th teaching data signal TD(C) is read out from the teaching data storing unit 13 (step S433), and it is judged whether or not a teaching signal T(C) of the teaching data signal TD(C) is set to "−1" (step S434).

In cases where the teaching signal T(C) is not set to "−1" a keyword number signal TnofKs(C) and a keyword group signal TKs(C) of the teaching data signal TD(C) are output from the judging parameter learning unit 21 to the learning vector generating unit 20 through the switches 17 and 18 (step S435). In the learning vector generating unit 20, a learning vector signal LV(LV(1), LV(2), . . . ,LV(nofDCK) is generated from the keyword number signal TnofKs(C) and the keyword group signal TKs(C) in the same manner as in the vector generating unit 1 (step S436), and the learning vector signal LV is fed to the learning score calculating unit 22 through the switch 16.

In the learning score calculating unit 22, a learning affirmative score signal LSY(C) and a learning negative score signal LSN(C) are calculated according to the learning vector signal LV, the affirmative metric signal MY and the negative metric signal MN in the same manner as in the score calculating unit 3, and the learning affirmative score signal LSY(C) and the learning negative score signal LSN (C) are fed to the judging parameter learning unit 21 (step S437). A judging parameter learning signal TC(C) composed of the teaching signal T(C) of the teaching data signal TD(C), the learning affirmative score signal LSY(C) and the learning negative score signal LSN(C) is stored in an internal storing element (step S438).

Thereafter, the value C of the teaching data counter is incremented by 1 (step S439), and the steps S433 to S439 are repeated for the calculation of the learning affirmative score signal LSY(C) and the learning negative score signal LSN (C) until the teaching signal T(C) is set to "−1" (step S434) or the value C reaches the number nofTD+1 (step S440). When the calculation of the learning affirmative score signal LSY(C) and the learning negative score signal LSN(C) is finished, a plurality of judging parameter learning signals TC(C) (C=1,2, . . . ) are obtained. Therefore, when each position (LSN(C), LSY (C)) corresponding to a teaching signal T(C)=0 is indicated by the cross symbol × and each position (LSN(C), LSY(C)) corresponding to a teaching signal T(C)=1 is indicated by the circle symbol ○, the positions for the judging parameter learning signals TC(C) are distributed as shown in FIG. 4. Therefore, as shown in FIG. 5, the judging parameter JP for separating the necessary information from the unnecessary information is calculated from the positions (LSN(C), LSY(C)) as shown in FIG. 4 according to a mountain climbing method and is written in the judging parameter storing unit 8 (step S441). Thereafter, the judging parameter learning control signal PLC is returned to the learning control unit 14 (step S442), and the operation of the judging parameter learning unit 21 is finished. Also, when the judging parameter learning control signal PLC is received in the learning control unit 14, the learning control operation indicating signal LI is set to a standby condition, and the operation of the learning unit 52 is finished.

Accordingly, the judging parameter JP for separating the necessary information from the unnecessary information can be calculated from the positions (LSN(C), LSY(C)). That is, as shown in FIG. 5, because the necessary information required by the user in the past are distributed on the above left side in the two-dimensional coordinate system and the unnecessary information judged by the user in the past are distributed on the bottom right side, the judging parameter JP can be determined, and the necessity signal N=SY−JP*SN can have a high value for the information data D required by the user.

In the first embodiment of the present invention, the necessity signal N for the necessary information required by the user can have a high value because of the learning based on the teaching signals input by the user, so that the necessary information required by the user can preferentially displayed on an interface unit such as a display unit.

In this embodiment, the mountain climbing method is used to calculate the judging parameter JP. However, it is applicable that the judging parameter JP be calculated according to a Newton's method to maximize a cost function COST as follows.

$$COST = \sum_c (2*T(C) - 1)(LSN(C) - JP*LSY(C))$$

Also, it is applicable that the affirmative metric signal MY and the negative metric signal MN be revised as follows by sing an oblivion effect.

$MY(i,j)=\alpha*MY(i,j)+LV(i)*LV(j)$ $MN(i,j)=\beta*MN(i,j)+LV(i)*LV(j)$

Here, α and β are respectively a positive value lower than 1.

Also, in cases where a keyword generating unit for generating the keyword group signal Ks and the keyword number signal nofKs from documents written in a literature "Information Processing Society Technical Report, Natural Language Processing 101-8 (May 27, 1994)") is added to the information filtering apparatus 91, an information filtering apparatus applicable for information to which any keyword is not attached can be obtained.

Also, in cases where a title is attached to information, it is applicable that a keyword be made of a word composing the title and a keyword number signal and a keyword group signal be generated.

Also, it is applicable that a classification symbol such as an international patent classification number attached to information be used as a keyword signal.

Also, the unread data URD stored in the unread data storing unit 10 are indicated one by one under the control of the unread data output control unit 11. However, it is applicable that a plurality of pieces of unread data URD be simultaneously indicated on the display unit 12 and each piece of unread data URD responded by the user be correctly informed of the information filtering apparatus 91.

Second Embodiment

Hereinafter, a second embodiment of the present invention is described with reference to drawings.

In the second embodiment, a dictionary learning unit is added to the information filtering apparatus 91 of the first embodiment to adapt the code dictionary signal DCK stored in the dictionary storing unit 2 to the user. Also, though the affirmative metric signal MY and the negative metric signal MN are respectively an auto-correlation matrix corresponding to a simple frequency distribution in the first embodiment, a probability distribution of keywords occurring in cases where pieces of information are necessary or unnecessary is considered in the second embodiment to generate the affirmative metric signal MY and the negative metric signal MN. Therefore, the metric learning unit 19 is replaced with a KD metric learning unit.

Figure 11:
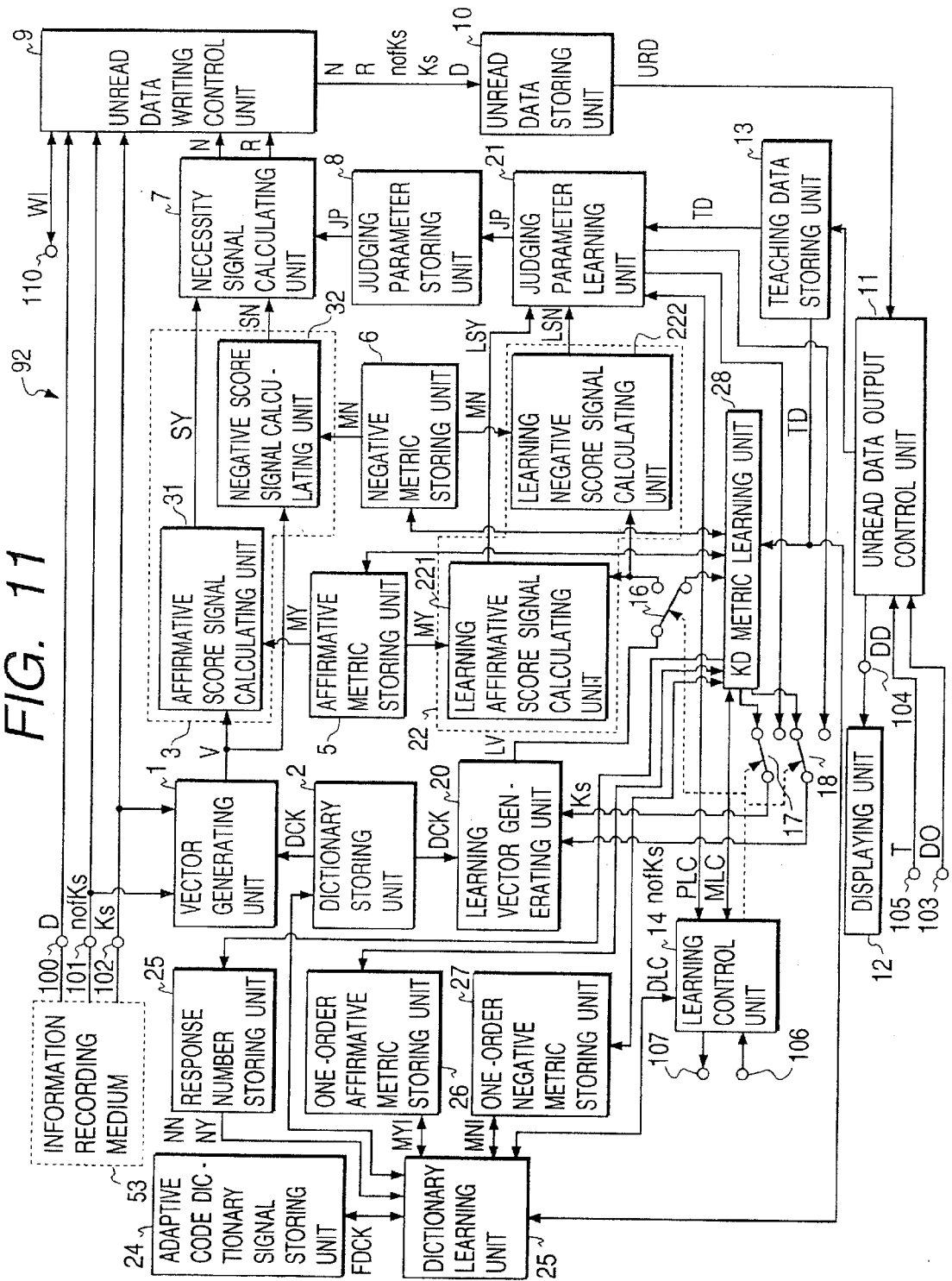
FIG. 11 is a block diagram of an information filtering apparatus according to a second embodiment of the present invention.

FIG. 11 is a block diagram of an information filtering apparatus according to a second embodiment of the present invention.

As shown in FIG. 11, an information filtering apparatus 92 comprises the vector generating unit 1, the code dictionary storing unit 2, the score calculating unit 3, the affirmative score signal calculating unit 5, the negative score signal calculating unit 6, the necessity signal calculating unit 7, the judging parameter storing unit 8, the unread data writing control unit 9, the unread data storing unit 10, the unread data output control unit 11, the teaching data storing unit 13, the learning control unit 14, the learning vector generating unit 20, the judging parameter learning unit 21, the learning score calculating unit 22, the switches 16, 17 and 18, a dictionary learning unit 23 for renewing the code dictionary signals DCK stored in the dictionary storing unit 2, an adaptive code dictionary signal storing unit 24 for storing a plurality of adaptive code dictionary signals FDCK formed of nofFDCK tables each of which is composed of a character stream W, a numeral C, an affirmative number PY indicating the number of affirmative judgements of the user which each are performed when a piece of information data D indicated to the user is necessary for the user on condition that the character stream W is included in a keyword group signal Ks corresponding to the piece of information data D as a keyword and a negative number PN indicating the number of negative judgements of the user which each are performed when a piece of information data D indicated to the user is unnecessary for the user on condition that the character stream W is included in a keyword group signal Ks corresponding to the piece of information data D as a keyword, a response number storing unit 25 for storing an affirmative response number NY indicating the total number of affirmative responses which each are performed when a piece of information data D indicated to the user is necessary for the user and a negative response number NN indicating the total number of negative responses which each are performed when a piece of information data D indicated to the user is unnecessary for the user, a one-order affirmative metric storing unit 26 for storing a one-order affirmative metric signal MY1 used for the renewal of the affirmative metric signal MY, a one-order negative metric storing unit 27 for storing a one-order negative metric signal MN1 used for the renewal of the negative metric signal MN, and a KD metric learning unit 28 for calculating the affirmative metric signal MY and the negative metric signal MN improved by using the affirmative response number NY and the negative response number NN stored in the response number storing unit 25 and the one-order affirmative metric signal MY1 and the one-order negative metric signal MN1 stored in the one-order affirmative and negative metric storing units 26 and 27 and writing the affirmative metric signal MY and the negative metric signal MN to the affirmative and negative metric storing units 5 and 6.

The adaptive code dictionary signals FDCK are expressed as follows.

$$FDCK(1) = (W(1), C(1), PY(1), PN(1))$$
$$\vdots \qquad \vdots$$
$$FDCK(nofFDCK) = (W(nofFDCK), C(nofFDCK), PY(nofFDCK), PN(nofFDCK))$$

In the above configuration, an operation of the information filtering apparatus 92 is described.

An example of a preferred initial condition of the information filtering apparatus 92 is as follows. The affirmative metric signal MY and the negative metric signal MN are respectively set to a (nofDCK*nofDCK) zero matrix, all necessity signals N(i) (i=1,2, . . . ,nofURD) of the unread data signal URD of the unread data storing unit 10 is set to a minimum value Vmin expressible by a hardware used for the unread data storing unit 10, all teaching signals T(j) of the teaching data signals TD(j) stored in the teaching data storing unit 13 are set to −1, each of all character streams W of the adaptive code dictionary signals FDCK is set to be blank, each numeral C(i) of the adaptive code dictionary signals FDCK is set to the number "i" (i=1,2, . . . ,nofFDCK), each affirmative number PY of the adaptive code dictionary signals FDCK is set to 0, each negative number PN of the adaptive code dictionary signals FDCK is set to 0, and each character stream W of the code dictionary signals DCK is set to be blank.

An operation of the information filtering unit 50 is described.

In an initial condition setting operation, the information filtering unit 50 is operated in the same manner as in the first embodiment. That is, the necessity signal N and the reliability signal R are set to 0 according to the keyword number signal nofKs, the keyword group signal Ks and the information data D input to the information filtering unit 50, and the keyword number signal nofKs, the keyword group signal Ks, the information data D, the necessity signal N and the reliability signal R are stored in the unread data storing unit 10 under the control of the unread data writing control unit 9.

Thereafter, the interface unit 51 is operated in the same manner as in the first embodiment. That is, the teaching data signal TD including the teaching data T is sent to the teaching data storing unit 13.

Figure 12:
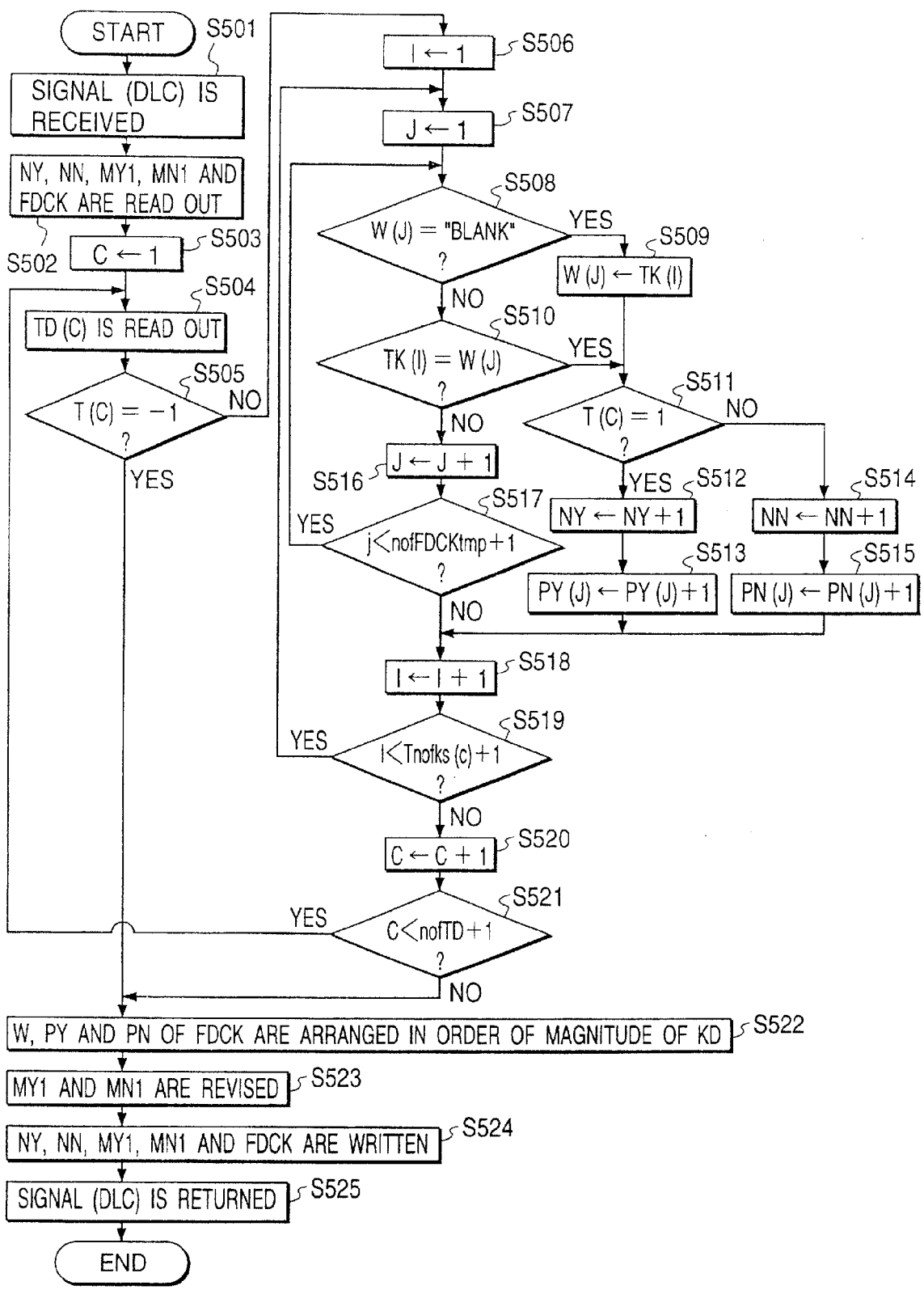
FIG. 12 is a flow chart showing an operation of a dictionary learning unit of the information filtering apparatus.

Thereafter, the learning unit 52 is operated. That is, when a learning start signal LS is input from the learning start signal input terminal 106 to the learning control unit 14, a learning control operation indicating signal LI is changed from "0" to "1" to indicate a condition that the learning unit 52 is operated. Thereafter, a dictionary learning signal DLC is transmitted from the learning control unit 14 to the dictionary learning unit 23, and the dictionary learning unit 23 is operated. The operation of the dictionary learning unit 23 is described in detail with reference to FIG. 12. When the dictionary learning signal DLC is received (step S501), a plurality of adaptive code dictionary signals FDCK are read out from the adaptive code dictionary signal storing unit 24 to an adaptive code signal buffer of the dictionary learning unit 23. The adaptive code signal buffer has a memory capacity for storing nofFDCKtmp adaptive code dictionary signals. Also, an affirmative response number NY and a negative response number NN are read out from the response number storing unit 25 to the dictionary learning unit 23, a one-order affirmative metric signal MY1 is read out from the one-order affirmative metric storing unit 26 to the dictionary learning unit 23, and a one-order negative metric signal MN1 is read out from the one-order negative metric storing unit 27 to the dictionary learning unit 23 (step S502). Thereafter, a value C of a teaching data counter of the dictionary learning unit 23 is set to 1 (step S503), a teaching data signal TD(C) is read out from the teaching data storing unit 13 (step S504), and it is judged whether or not a teaching signal T(C) of the teaching data signal TD(C) is −1 (step S505).

In cases where the teaching signal T(C) is −1, a following operation is performed. A value I of a keyword number counter of the dictionary learning unit 23 is set to 1 (step S506), a value J of an adaptive code dictionary counter is set to 1 (step S507), and it is judged whether or not a character stream W(J) of the adaptive code dictionary signal FDCK(J) is blank (step S508). In cases where the character stream W(J) is blank, the character stream W(J) is set to a keyword TK(I) of a keyword group signal TKs(C) of the teaching data signal TD(C) (step S509). In contrast, in cases where the character stream W(J) is not blank, it is judged whether or not the keyword TK(I) agrees with the character stream W(J) (step S510). In cases where the keyword TK(I) agrees with the character stream W(J) or the character stream W(J) is blank, the procedure proceeds to a step S511, and it is judged whether or not the teaching signal T(C) of the teaching data signal TD(C) is equal to 1. In cases where the teaching signal T(C) is equal to 1, the affirmative response number NY is incremented by 1 (step S512), and the affirmative number PY(J) of the adaptive code dictionary signal FDCK(J) is incremented by 1 (step S513). In contrast, in cases where the teaching signal T(C) is not equal to 1 (that is, the teaching signal T(C) is equal to 0), the negative response number NN is incremented by 1 (step S514), and the negative number PN(J) of the adaptive code dictionary signal FDCK(J) is incremented by 1 (step S515).

In cases where the keyword TK(I) does not agree with the character stream W(J) (step S510), the value J of the adaptive code dictionary counter is incremented by 1 (step S516), and it is judged whether or not the value J is lower than a value nofFDCKtmp+1 (step S517). In cases where the value J is lower than the value nofFDCKtmp+1, because the adaptive code dictionary signal FDCK(J) is stored in the dictionary learning unit 23, the procedure returns to the step S508, and the steps S508 to S517 are repeated. In contrast, in cases where the value J is not lower than the value nofFDCKtmp+1 or the step S513 or S515 is performed, the value I of the keyword number counter of the dictionary learning unit 23 is incremented by 1 (step S518), and it is judged whether or not the value I is lower than a value TnofKs(C)+1 (step S519). Here, a value TnofKs(C) denotes the number of keywords indicated by the keyword number signal Tnofk(C) of the teaching data signal TD(C). In cases where the value I is lower than the value TnofKs(C)+1, because the keyword TK(I) exists in the keyword group signal TKs(C) of the teaching data signal TD(C), the steps S507 to S519 are repeated. In contrast, in cases where the value I is not lower than the value TnofKs(C)+1, the value C of the teaching data counter is incremented by 1 (step S520), and it is judged whether or not the value C is lower than a value nofTD+1 (step S521). Here, the value nofTD denotes the number of teaching data signals TD. In cases where the value C is lower than the value nofTD+1, because the teaching data signals TD(C) is stored in the teaching data storing unit 13, the procedure returns to the step S504.

Therefore, the steps S504 to S521 are performed for all teaching data signals TD stored in the teaching data storing unit 13 on condition that the teaching signal T(C) is equal to 0 or 1.

Thereafter, a keyword cost signal KD is calculated for each of the adaptive code dictionary signals FDCK in the dictionary learning unit 23. The keyword cost signal KD is used to judge whether or not a corresponding character stream W is effective as a keyword.

In detail, an occurrence probability $P_{NN}$ of information data D judged as unnecessary data by the user is expressed as follows.

$$P_{NN}=NN/(NY+NN)$$

An unnecessary probability $P_{PN}$ that information data D to which a character stream W(J) is attached is judged by the user to be unnecessary is expressed as follows.

$$P_{PN}=PN(J)/(PY(J)+PN(J))$$

In cases where a value of the keyword cost signal KD becomes high as the unnecessary probability $P_{PN}$ is considerably higher than the occurrence probability $P_{NN}$, the character stream W(J) is effective as a keyword to judge that the information data D is unnecessary for the user.

Also, an occurrence probability $P_{NY}$ of information data D judged as necessary data by the user is expressed as follows.

$$P_{NY}=NY/(NY+NN)$$

A necessary probability $P_{PY}$ that information data D to which a character stream W(J) is attached is judged by the user to be necessary is expressed as follows.

$$P_{PY}=PY(J)/(PY(J)+PN(J))$$

In cases where a value of the keyword cost signal KD becomes high as the necessary probability $P_{PY}$ is considerably higher than the occurrence probability $P_{NY}$, the character stream W(J) is effective as a keyword to judge that the information data D is necessary for the user.

Therefore, in cases where the keyword cost signal KD reflects the relationship between the unnecessary probability $P_{PN}$ and the occurrence probability $P_{NN}$ and the relationship between the necessary probability $P_{PY}$ and the occurrence probability $P_{NY}$, any type of keyword cost signal KD is useful. As an example, a type of keyword cost signal KD called a calvac divergence is known as follows.

$$KD(J)=NY/(NY+NN)*\log((PY(J))/(PY(J)+PN(J))) +NN/(NY+NN)*\log((PN(J))/(PY(J)+PN(J)))$$

However, because the affirmative response number NY, the negative response number NN, the affirmative number PY(J) and the negative number PN(J) are set to 0 in the initial condition, the calculation of $\log((PY(J))/(PY(J)+PN(J)))$ and $\log((PN(J))/(PY(J)+PN(J)))$ cannot be performed. Also, the adoption of the type of keyword cost signal KD called the calvac divergence is inappropriate because the keyword cost signal KD of the adaptive code dictionary signals FDCK satisfying a relationship $PY(J)+PN(J) \cong 1$ is overestimated. To avoid the above drawbacks, as a preferred example, another type of keyword cost signal KD is expressed as follows.

$$KD(J)=\tanh\{(PY(J)+PN(J))/PC\}*\tanh\{NY/(NY+NN)*\log((PY(J)+\epsilon)/(PY(J)+PN(J)+2\epsilon))+NN/(NY+NN)*\log((PN(J)+\epsilon)/(PY(J)+PN(J)+2\epsilon))\}$$

Here, $\epsilon$ adopted to avoid a division by a divisor of zero and the calculation of log(0) denotes a parameter having a low positive value. A parameter PC is about 3.

Thereafter, the character streams W, the affirmative numbers PY and the negative numbers PN of the adaptive code dictionary signals FDCK are arranged in order of magnitude of the keyword cost signals KD (step S522). In this case, the numerals C of the adaptive code dictionary signals FDCK are arranged in an initial order. By using the initial order of the numerals C, elements of the one-order affirmative metric signal MY1 are revised (step S523). That is, in cases where the numerals C(i) and C(j) are lower than the number nofDCK of code dictionary signals DCK, elements M(i,j) of a matrix are calculated from the one-order affirmative metric signal MY1.

$$M(i,j)=MY1(C(i),C(j)) \quad i,j=1,\ldots,nofDCK$$

In cases where C(i)=C(j) is satisfied and the numeral C(i) is equal to or higher than the number nofDCK, elements M(i,i)

of the matrix are calculated from the affirmative numbers PY.

$$M(i,i)=PY(C(i))\ i=1,\ldots,nofDCK$$

In cases where $C(i) \neq C(j)$ is satisfied and the numeral $C(i)$ is equal to or higher than the number nofDCK, $$M(i,j)=0\ i,j=1,\ldots,nofDCK$$

is determined. Thereafter, elements of the one-order affirmative metric signal MY1 are determined as follows.

$$MY1(i,j)=M(i,j)\ i,j=1,\ldots,nofDCK$$

Also, elements of the one-order negative metric signal MN1 are revised in the same manner as the one-order affirmative metric signal MY1 (step S523). That is, in cases where the numerals $C(i)$ and $C(j)$ are lower than the number nofDCK of code dictionary signals DCK, elements $M(i,j)$ of a matrix are calculated from the one-order negative metric signal MN1.

$$M(i,j)=MN1(C(i),C(j))\ i,j=1,\ldots,nofDCK$$

In cases where $C(i)=C(j)$ is satisfied and the numeral $C(i)$ is equal to or higher than the number nofDCK, elements $M(i,i)$ of the matrix are calculated from the negative numbers PN.

$$M(i,i)=PN(C(i))\ i=1,\ldots,nofDCK$$

In cases where $C(i) \neq C(j)$ is satisfied and the numeral $C(i)$ is equal to or higher than the number nofDCK, $$M(i,j)=0\ i,j=1,\ldots,nofDCK$$

is determined. Thereafter, elements of the one-order negative metric signal MN1 are determined as follows.

$$MN1(i,j)=M(i,j)\ i,j=1,\ldots,nofDCK$$

Thereafter, the numerals C of the adaptive code dictionary signals FDCK stored in the adaptive code dictionary signal buffer are rewritten as follows.

$$C(j)=j\ j=1,\ldots,nofFCKtmp$$

Thereafter, upper nofDCK character streams W and numerals C of the adaptive code dictionary signals FDCK stored in the adaptive code dictionary signal buffer are written in the dictionary storing unit 2 as a plurality of code dictionary signals DCK of which the number is nofDCK, upper nofFDCK adaptive code dictionary signals FDCK stored in the adaptive code dictionary signal buffer are written in the adaptive code dictionary signal storing unit 24, the affirmative response number NY and the negative response number NN are written in the response number storing unit 25, the one-order affirmative metric signal MY1 is written in the one-order affirmative metric storing unit 26, and the one-order negative metric signal MN1 is written in the one-order negative metric storing unit 27 (step S524).

Thereafter, the dictionary learning signal DLC is returned to the learning control unit 14 (step S525), and the operation of the dictionary learning unit 23 is finished.

After the operation of the dictionary learning unit 23, the switches 16 to 18 are changed over by the learning control unit 14 to connect the KD metric learning unit 28 with the learning vector generating unit 20, a metric learning control signal MLC is transmitted from the learning control unit 14 to the KD metric learning unit 28, and an operation of the KD metric learning unit 28 is started.

That is, the one-order affirmative metric signal MY1 is read out from the one-order affirmative metric storing unit 26 to the KD metric learning unit 28, the one-order negative metric signal MN1 is read out from the one-order negative metric storing unit 27 to the KD metric learning unit 28, and a value C of a teaching data counter is set to 1 in the KD metric learning unit 28. Thereafter, a C-th teaching data signal TD(C) is read out from the teaching data storing unit 13 to the KD metric learning unit 28, and it is judged whether or not a teaching signal T(C) of the teaching data signal TD(C) is set to "−1". In cases where the teaching signal T(C) is not set to "−1", a keyword number signal TnofKs(C) and a keyword group signal TKs(C) of the teaching data signal TD(C) are output from the KD metric learning unit 28 to the learning vector generating unit 20 through the switches 17 and 18. In the learning vector generating unit 20, a learning vector signal LV(LV(1), LV(2), ..., LV(nofDCK)) is generated from the keyword number signal TnofKs(C) and the keyword group signal TKs(C) in the same manner as in the vector generating unit 1, and the learning vector signal LV is fed to the KD metric learning unit 28 through the switch 16. In the KD metric learning unit 28, in cases where the teaching signal T(C) of the teaching data signal TD(C) is set to "1", the one-order affirmative metric signal MY1 is revised as follows.

$$MY1(i,j)=MY1(i,j)+LV(i)*LV(j)\ (i,j=1,2,\ldots,nofDCK)$$

Also, in cases where the teaching signal T(C) of the teaching data signal TD(C) is set to "0", the one-order negative metric signal MN1 is revised as follows.

$$MN1(i,j)=MN1(i,j)+LV(i)*LV(j)\ (i,j=1,2,\ldots,nofDCK)$$

Thereafter, the value C of the teaching data counter is incremented by 1, and the operation of the KD metric learning unit 28 is repeated until the teaching signal T(C) of the teaching data signal TD(C) is set to "−1" or the incremented value C reaches a value nofTD. When T(C)=−1 or C=nofTD is satisfied, the learning of the one-order affirmative metric signal MY1 and the one-order negative metric signal MN1 is finished.

Thereafter, the affirmative response number NY and the negative response number NN are read out from the response number storing unit 25 to the KD metric learning unit 28, and the affirmative metric signal MY and the negative metric signal MN are calculated from the affirmative response number NY, the negative response number NN, the one-order affirmative metric signal MY1 and the one-order negative metric signal MN1. The calculation of the affirmative metric signal MY and the negative metric signal MN are performed in the same manner as that of the keyword cost signal KD. That is, an occurrence probability $P_{NN}$ of information data D judged as unnecessary data by the user is expressed as follows.

$$P_{NN}=NN/(NY+NN)$$

An unnecessary probability $P_{PN}$ that information data D to which a character stream W(J) is attached is judged by the user to be unnecessary is expressed as follows.

$$P_{PN}=PN(J)/(PY(J)+PN(J))$$

The negative metric signal MN is calculated on condition that a value of the negative score signal SN becomes high as the unnecessary probability $P_{PN}$ is higher than the occurrence probability $P_{NN}$.

Also, an occurrence probability $P_{NY}$ of information data D judged as necessary data by the user is expressed as follows.

$$P_{NY}=NY/(NY+NN)$$

A necessary probability $P_{PY}$ that information data D to which a character stream W(J) is attached is judged by the user to be necessary is expressed as follows.

$$P_{PY}=PY(J)/(PY(J)+PN(J))$$

The affirmative metric signal MY is calculated on condition that a value of the affirmative score signal SN becomes high as the necessary probability $P_{PY}$ is higher than the occurrence probability $P_{NY}$.

Therefore, in cases where the affirmative metric signal MY and the negative metric signal MN satisfy the above condition, any type of affirmative metric signal MY and negative metric signal MN is useful. As a preferred example, a type of affirmative metric signal MY is expressed as follows.

$$MY(i,j)=NY/(NY+NN)*\log\{(MY1(i,j)+\epsilon)*(NY+NN)/(NY*(MY1(i,j)+MN1(i,j)+2\epsilon))\}$$

Here, $\epsilon$ adopted to avoid a division by a divisor of zero and the calculation of log(0) denotes a parameter having a low positive value.

A type of negative metric signal MN is expressed as follows.

$$MN(i,j)=NN/(NY+NN)*\log\{(MN1(i,j)+\epsilon)*(NY+NN)/(NN*(MY1(i,j)+MN1(i,j)+2\epsilon))\}$$

Thereafter, the one-order affirmative metric signal MY1 renewed in the KD metric learning unit 28 is stored in the one-order affirmative metric storing unit 26, the one-order negative metric signal MN1 renewed in the KD metric learning unit 28 is stored in the one-order negative metric storing unit 27, the affirmative metric signal MY calculated in the KD metric learning unit 28 is stored in the affirmative metric storing unit 5, and the negative metric signal MN calculated in the KD metric learning unit 28 is stored in the negative metric storing unit 6. Therefore, the processing of the metric learning performed in the KD metric learning unit 28 is finished, and the metric learning control signal MLC is returned to the learning control unit 14.

When the metric learning control signal MLC is received in the learning control unit 14, the switch 16 is changed over to connect the score calculating unit 22 with the learning vector generating unit 20 under the control of the learning control unit 14, the switches 17 and 18 are changed over to connect the judging parameter learning unit 21 with the learning vector generating unit 20 under the control of the learning control unit 14, and a judging parameter learning control signal PLC is fed from the learning control unit 14 to the judging parameter learning unit 21. Therefore, the judging parameter learning unit 21 is operated in the same manner as in the first embodiment.

After the operation of the information filtering apparatus 92 is once performed, because the upper nofDCK character streams W and numerals C of the adaptive code dictionary signals FDCK are stored in the dictionary storing unit 2 as the code dictionary signals DCK, the necessity signal N and the reliability signal R output from the necessity calculating unit 7 are not zero, and a piece of information data D judged as necessary data by the user is written in an upper position of the unread data storing unit 10.

Therefore, in cases where the operation of the information filtering apparatus 92 is repeated, a plurality of keywords (or character streams W) effective to judge whether or not each piece of information data D is necessary for the user can be preferentially stored in the dictionary storing unit 2, and an information filtering operation can be performed with a high precision even though a memory capacity of the dictionary storing unit 2 is small.

The feature of the second embodiment is that symbol information such as keywords is projected on a two-dimensional metric space by introducing metric in which the simultaneous occurrence of the keywords is considered. Therefore, a far and near relationship between the keywords can be estimated by an analog scale such as metric. That is, though the alternative judgement of necessity or unnecessity is performed in the prior art to estimate the necessity for each piece of information data, a plurality of pieces of information data can be arranged in order of necessity.

Also, the necessity signal N for the necessary information required by the user can have a high value because of the learning based on the teaching signals T input by the user, so that the necessary information required by the user can preferentially displayed on an interface unit such as a display unit.

In this embodiment, the mountain climbing method is used to calculate the judging parameter JP. However, it is applicable that the judging parameter JP be calculated according to a Newton's method. Also, it is applicable that a more simplified method for calculating the judging parameter JP is used as follows.

$$JP=\tan\theta i$$

Here, $$\theta i=0.5*\pi*(i/90) \ i=1,\ldots,90$$

The value i is determined on condition that a piece of information data corresponding to T(C)=1 is discriminated from another piece of information data corresponding to T(C)=0 as easy as possible.

Also, it is applicable that the one-order affirmative metric signal MY1 and the one-order negative metric signal MN1 be revised as follows by using an oblivion effect.

$$MY1(i,j)=\alpha*MY1(i,j)+LV(i)*LV(j)$$

$$MN1(i,j)=\alpha*MN1(i,j)+LV(i)*LV(j)$$

Here, $\alpha$ is a positive value lower than 1.

Also, it is applicable that the one-order affirmative metric signal MY1 or the one-order negative metric signal MN1 be reduced as follows in cases where the one-order affirmative metric signal MY1 or the one-order negative metric signal MN1 exceeds a prescribed value.

$$MY1(i,j)=MY1(i,j)/2$$

$$MN1(i,j)=MN1(i,j)/2$$

Therefore, an overflow of the one-order affirmative metric signal MY1 or the one-order negative metric signal MN1 can be prevented.

Also, this overflow preventing method can be applied for the calculation of the affirmative numbers PY and the negative numbers PN of the adaptive code dictionary signals FDCK, the affirmative response number NY and the negative response number NN.

Also, in cases where a keyword generating unit for generating the keyword group signal Ks and the keyword number signal nofKs from documents written in the literature "Information Processing Society Technical Report, Natural Language Processing 101-8 (May 27, 1994)") is added to the information filtering apparatus 92, an information filtering apparatus applicable for information to which any keyword is not attached can be obtained.

Also, in cases where a title is attached to information, it is applicable that a keyword be made of a word composing the title and a keyword number signal and a keyword group signal be generated.

Also, it is applicable that a classification symbol such as an international patent classification number attached to information be used as a keyword signal.

Also, the unread data URD stored in the unread data storing unit 10 are indicated one by one under the control of the unread data output control unit 11. However, it is applicable that a plurality of pieces of unread data URD be simultaneously indicated on the display unit 12 and each piece of unread data URD responded by the user be correctly informed of the information filtering apparatus 92.

Third Embodiment

Hereinafter, a third embodiment of the present invention is described with reference to drawings.

In the third embodiment, an adaptive data base in which pieces of data are arranged in order of necessity for the user is used.

Figure 13:
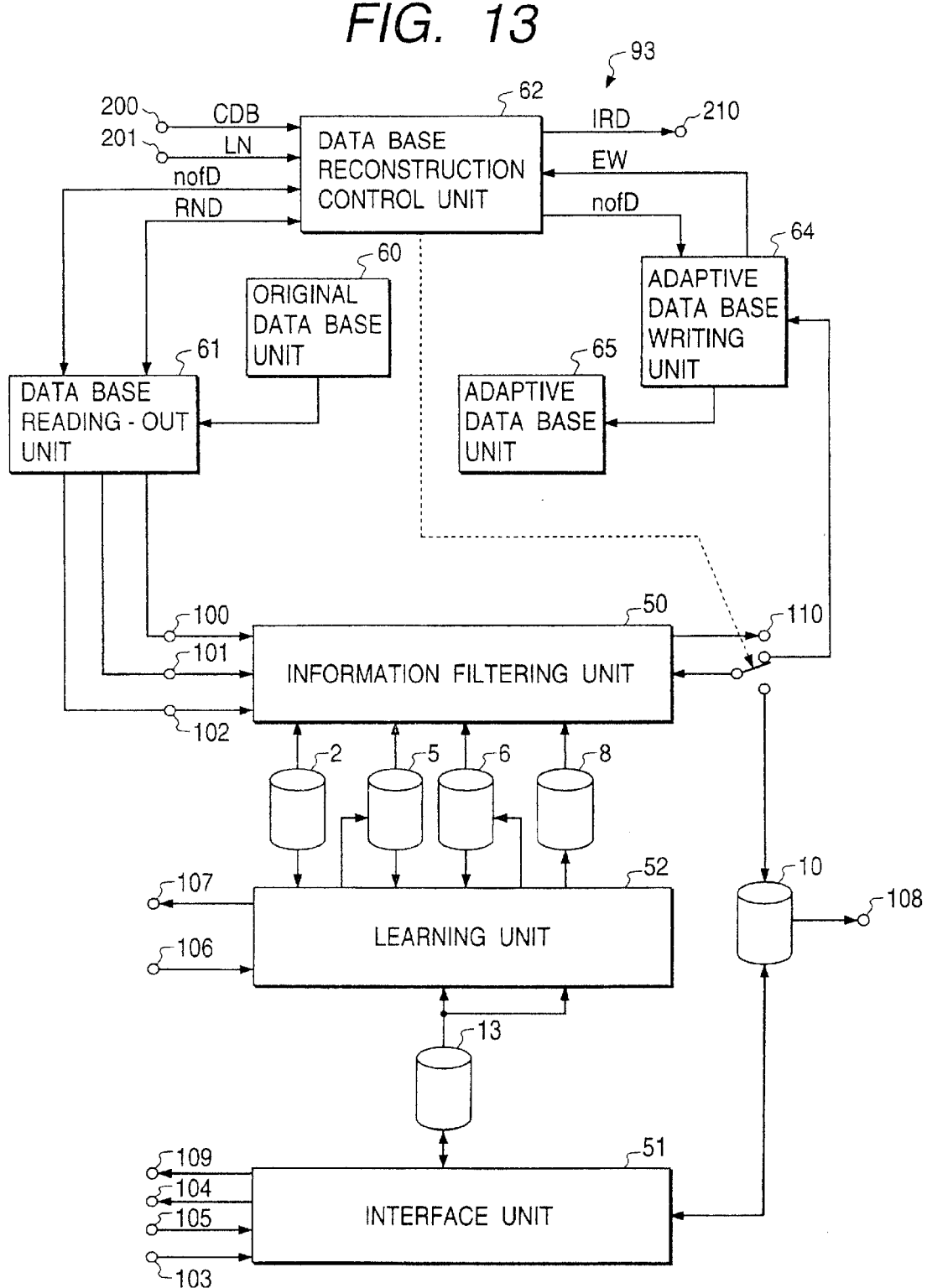
FIG. 13 is a functional block diagram of an information filtering apparatus according to a third embodiment.

FIG. 13 is a functional block diagram of an information filtering apparatus according to a third embodiment.

As shown in FIG. 13, an information filtering apparatus 93 comprises the information filtering unit 50, the code dictionary storing unit 2, the affirmative score signal calculating unit 5, the negative score signal calculating unit 6, the judging parameter storing unit 8, the unread data storing unit 10, the interface unit 51, the teaching data storing unit 13, the learning unit 52 including the dictionary learning unit 23, the adaptive code dictionary signal storing unit 24, the response number storing unit 25, the one-order affirmative metric storing unit 26, the one-order negative metric storing unit 27 and the KD metric learning unit 28, an original data base unit 60 for storing pieces of data such as information data D, keyword signals nofKs and keyword group signals Ks, a data base reading-out unit 61 for reading out the data from the original data base unit 60, reshaping the data to pieces of data appropriate for the information filtering apparatus 93, a data base reconstruction control unit 62 for controlling the reconstruction of the original data base unit 60, a switch 63, an adaptive data base writing unit 64 for temporarily holding pieces of adaptive data which are obtained by arranging the data stored in the original data base unit 60 in order of necessity in the information filtering unit 50 and are transmitted from the information filtering unit 50 through the switch 63, an adaptive data base unit 65 for storing the pieces of adaptive data held in the adaptive data base writing unit 64, a control signal input terminal 200 for receiving a control signal for controlling the data base reconstruction control unit 62, and a learning number signal input terminal 201 for receiving a learning number signal indicating the number of learning operations performed in the information filtering apparatus 93.

A data base reconstructing apparatus comprises the original data base unit 60, the data base reading-out unit 61, the data base reconstruction control unit 62, the switch 63, the adaptive data base writing unit 64 and the adaptive data base unit 65

In the above configuration of the information filtering apparatus 93, an operation for reconstructing the original data base unit 60 in the data base reconstructing apparatus is described.

A control signal CDB (CDB=1) indicating the start of a data base reconstructing operation is initially input from the control signal input terminal 200 to the data base reconstruction control unit 62, and a learning number signal LN indicating the number LN of learning operations is input from the learning number signal input terminal 201 to the data base reconstruction control unit 62. In the data base reconstruction control unit 62, a data base reconstruction control indicating signal IRD output from a data base reconstruction control indicating signal output terminal 210 is changed from "0" to "1", so that it is indicated to the user that the information filtering apparatus 93 is in the middle of the operation for reconstructing a data base. Thereafter, the switch 63 is changed over by the data base reconstruction control unit 62 to connect the information filtering unit 50 with the unread data storing unit 10. Also, after the reception of the control signal SDB set to "1", an instruction is transmitted from the data base reconstruction control unit 62 to the data base reading-out unit 61 to examine the number of data stored in the original data base unit 60. Therefore, the number of data stored in the original data base unit 60 is examined, and a data number signal nofD indicating the number of data is transmitted from the data base reading-out unit 61 to the data base reconstruction control unit 62. In the data base reconstruction control unit 62, the number nofURD of unread data stored in the adaptive data base writing unit 64 is replaced with the data number signal nofD. Thereafter, the learning number signal LN is transmitted from the data base reconstruction control unit 62 to the data base reading-out unit 61 as a data number signal RDN.

In the data base reading-out unit 61, LN pieces of data are read out from the original data base unit 60 one after another according to the learning number signal LN, the data are reshaped and transmitted to the information filtering unit 50. In the information filtering unit 50, the same operation as in the second embodiment is performed. That is, LN pieces of unread data URD are stored in the unread data storing unit 10. Thereafter, the interface unit 51 is actuated by the user, the LN pieces of unread data URD stored in the unread data storing unit 10 are read out one after another to the unread data output control unit 11, and a teaching signal T indicating necessity or unnecessity is input to the unread data output control unit 11 in correspondence to each piece of unread data URD. After the input of the teaching signals T corresponding to the LN pieces of unread data URD is finished, a learning start signal LS is input by the user from the learning start signal input terminal 106 to the learning unit 52, and the learning of the information filtering apparatus 93 is performed. When a learning control operation indicating signal LI output from the learning unit 52 to the data base reconstruction control unit 62 through a learning control unit indicating signal output terminal 107 is changed from "1" to "0" to indicate the finish of the learning, another data number signal RDN is transmitted from the data base reconstruction control unit 62 to the data base reading-out unit 61 to read out other LN pieces of data from the original data base unit 60 to the information filtering unit 50. Therefore, the other LN pieces of data are rearranged in order of necessity for the user, and LN pieces of unread data URD are stored in the unread data storing unit 10.

Thereafter, the interface unit 51 is actuated by the user, the user ascertains whether or not necessary information is placed on an upper side while judging whether or not each of the LN pieces of unread data URD is necessary for the user, and the user judges whether or not another learning operation is still necessary for the information filtering apparatus 93. In cases where the learning of the information filtering apparatus 93 is not sufficient and another learning operation is still necessary for the information filtering apparatus 93, the learning start signal LS is input once more by the user from the learning start signal input terminal 106 to the learning unit 52, and the learning of the information filtering apparatus 93 is performed.

In cases where the learning of the information filtering apparatus 93 is sufficient and any learning operation is not necessary for the information filtering apparatus 93, a control signal CDB (CDB=2) indicating the performance of a data base reconstructing operation is input by the user from the control signal input terminal 200 to the data base reconstruction control unit 62, and the switch 63 is changed over by the data base reconstruction control unit 62 to connect the information filtering unit 50 with the adaptive data base writing unit 64. Thereafter, a data number signal RDN is transmitted from the data base reconstruction control unit 62 to the data base reading-out unit 61 to read out nofD pieces of data from the original data base unit 60. Therefore, nofD pieces of data are read out one after another from the original data base unit 60 to the data base reading-out unit 61 and are sent to the information filtering unit 50. In the information filtering unit 50, the nofD pieces of data are rearranged in order of necessity for the user and are written in a buffer of the adaptive data base writing unit 64 one after another. When the number of data written in the buffer reaches the value nofD, the nofD pieces of data rearranged in order of necessity are written in the adaptive data base unit 65, and a writing operation finishing signal EW is transmitted from the adaptive data base writing unit 64 to the data base reconstruction control unit 62. In the data base reconstruction control unit 62, the data base reconstruction control indicating signal IRD output from the data base reconstruction control indicating signal output terminal 210 is changed from "1" to "0", and the performance of the data base reconstructing operation is finished.

Accordingly, because the data base reconstructing apparatus comprising the original data base unit 60, the data base reading-out unit 61, the data base reconstruction control unit 62, the adaptive data base writing unit 64 and the adaptive data base unit 65 is used, an adaptive data base in which pieces of data are arranged in order of necessity for the user can be made.

In this embodiment, data of the adaptive data base unit 65 is the same as those of the original data base 60. However, to save a memory region of the adaptive data base unit 65, it is applicable that the adaptive data base unit 65 is composed of link information between the data.

Fourth Embodiment

Hereinafter, a fourth embodiment of the present invention is described with reference to drawings.

In the fourth embodiment, a keyword retrieval equation generating apparatus in which a retrieval equation for retrieving necessary information by responding that information indicated to the user is necessary or unnecessary is automatically generated is used.

Figure 14:
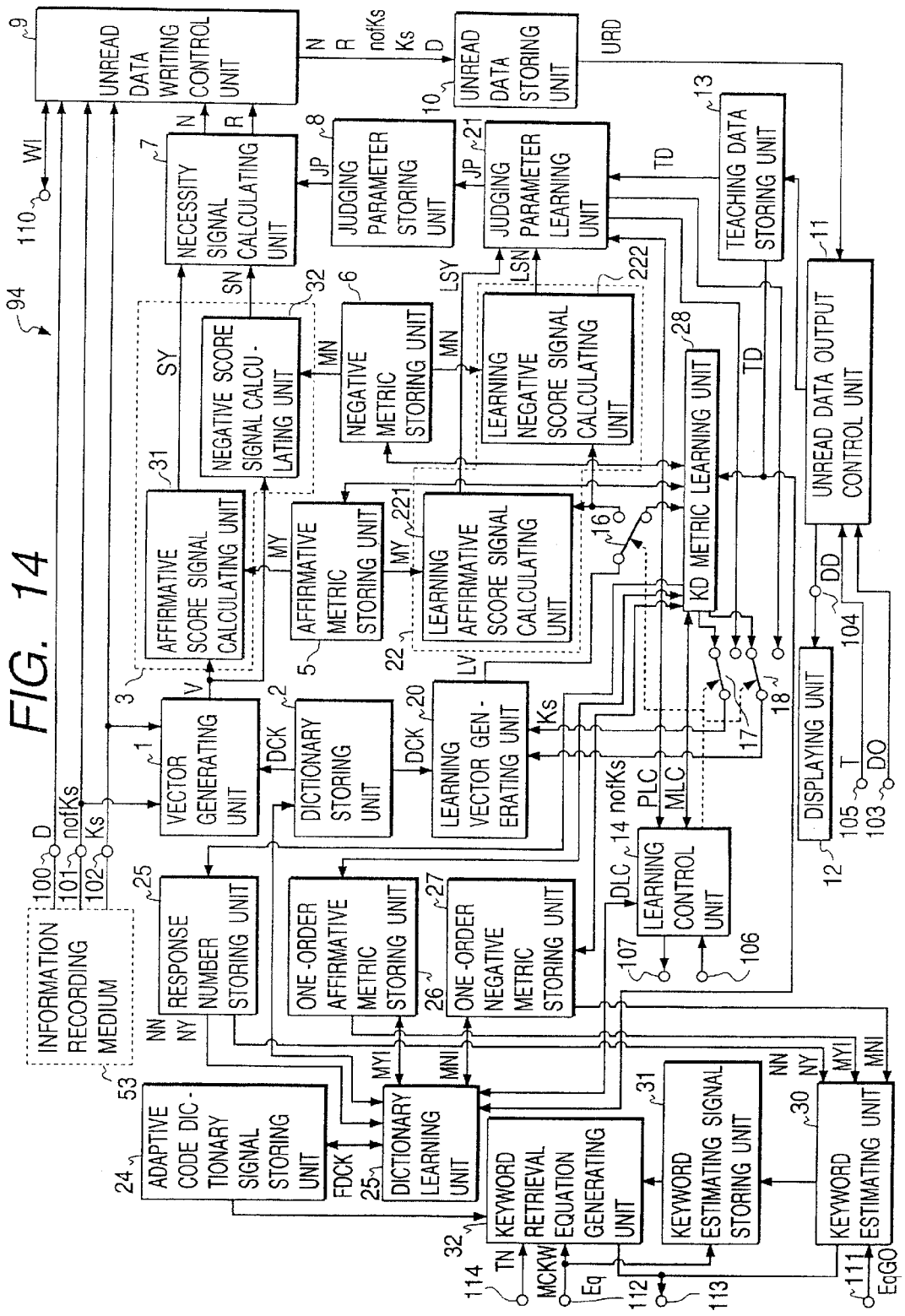
FIG. 14 is a block diagram of an information filtering apparatus according to a fourth embodiment.

FIG. 14 is a block diagram of an information filtering apparatus according to a fourth embodiment.

As shown in FIG. 14, an information filtering apparatus 94 comprises the vector generating unit 1, the code dictionary storing unit 2, the score calculating unit 3, the affirmative score signal calculating unit 5, the negative score signal calculating unit 6, the necessity signal calculating unit 7, the judging parameter storing unit 8, the unread data writing control unit 9, the unread data storing unit 10, the unread data output control unit 11, the teaching data storing unit 13, the learning control unit 14, the learning vector generating unit 20, the judging parameter learning unit 21, the learning score calculating unit 22, the switches 16, 17 and 18, the dictionary learning unit 23, the adaptive code dictionary signal storing unit 24, the response number storing unit 25, the one-order affirmative metric storing unit 26, the one-order negative metric storing unit 27, the KD metric learning unit 28, a keyword estimating unit 30 for calculating a plurality of keyword estimating signals KWKD(k) used to estimate necessity of elements (i,j) of a metric according to a keyword retrieval equation generating start signal input from a keyword retrieval equation generating start signal input terminal 111, a keyword estimating signal sorting unit 31 for sorting a plurality of keyword estimating signals KWKD(k) calculated in the keyword estimating unit 30 in the order of increasing values of the keyword estimating signals KWKD(k) according to a keyword retrieval equation generating method changing-over signal input from a keyword retrieval equation generating method changing-over signal input terminal 112, and a keyword retrieval equation generating unit 32 for generating a keyword retrieval equation by transforming the keyword estimating signals KWKD(k) sorted by the keyword estimating signal sorting unit 31 into a keyword retrieval equation signal Eq according to an adaptive dictionary signal.

A keyword retrieval equation generating apparatus comprises the keyword estimating unit 30, the keyword estimating signal sorting unit 31 and the keyword retrieval equation generating unit 32.

In the above configuration of the information filtering apparatus 94, an automatic generation of a retrieval equation used to retrieve necessary information is described.

Figure 15:
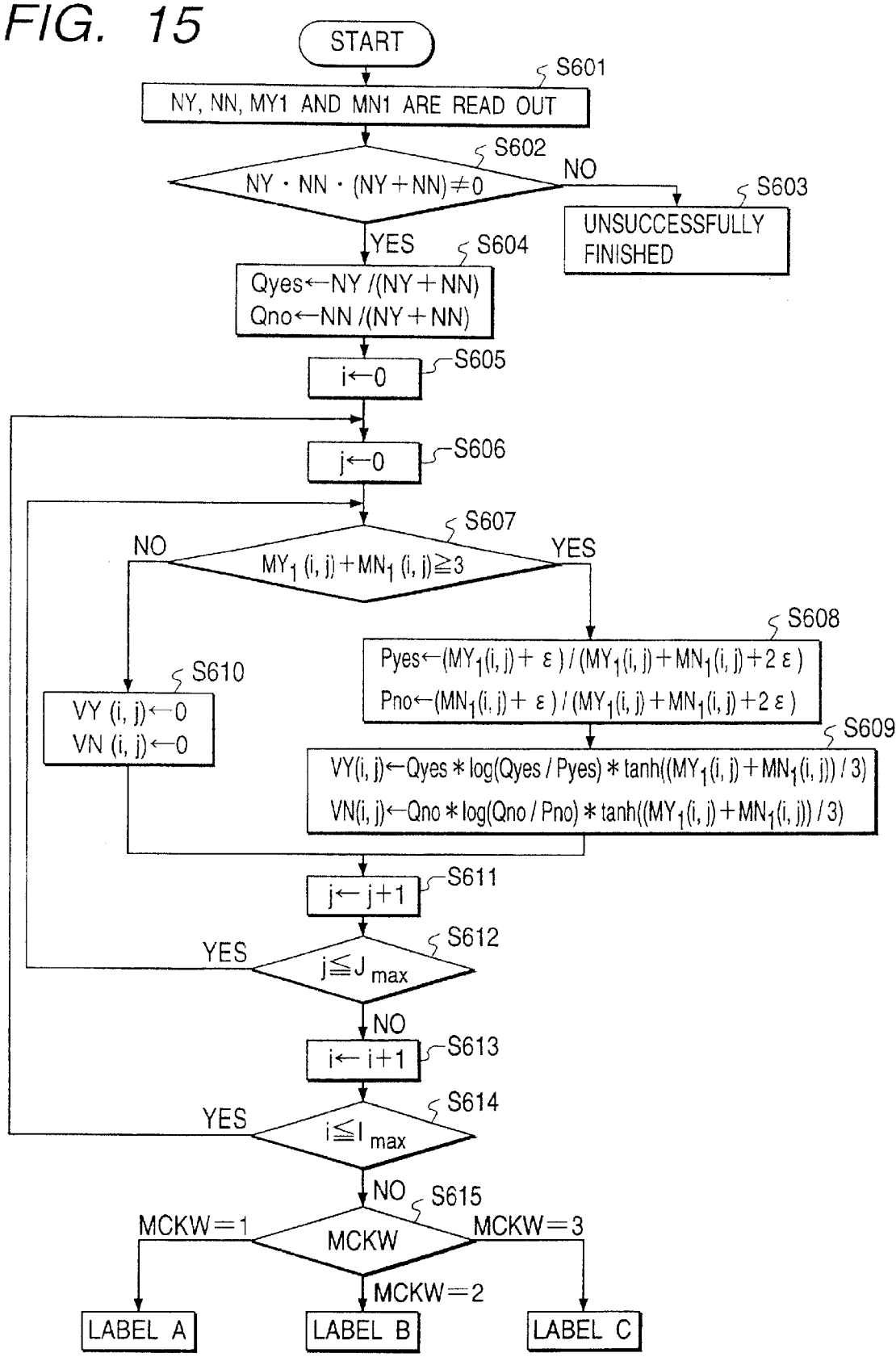
FIG. 15 is a flow chart showing the first half of the automatic generation of a retrieval equation.

FIG. 15 is a flow chart showing the first half of the automatic generation of a retrieval equation.

As shown in FIG. 15, when a keyword retrieval equation generating start signal EqGO indicating the start of the generation of a keyword retrieval equation is input from the keyword retrieval equation generating start signal input terminal 111 to the keyword estimating unit 30, the affirmative response number NY and the negative response number NN are read out from the response number storing unit 25 to the keyword estimating unit 30, the one-order affirmative metric signal MY1 is read out from the one-order affirmative metric storing unit 26 to the keyword estimating unit 30, the one-order negative metric signal MN1 is read out from the one-order negative metric storing unit 27 to the keyword estimating unit 30 (step S601).

Thereafter, it is ascertained in the keyword estimating unit 30 whether or not the response of necessity or unnecessity for information data shown on the display unit 12 of the information filtering apparatus 94 is performed by the user. That is, a sum NY+NN of the affirmative response number NY and the negative response number NN is calculated, a product NY*NN*(NY+NN) is calculated, and it is judged whether or not the product NY*NN*(NY+NN) is equal to zero (step S602). A relationship NY*NN*(NY+NN)=0 denotes that any response of necessity or unnecessity for information data shown on a display unit of the information filtering apparatus 94 is not performed by the user. Therefore, in cases where the product NY*NN*(NY+NN) is equal to zero, any keyword retrieval equation cannot be estimated. Therefore, a keyword retrieval equation signal Eq indicating that a keyword retrieval equation is unknown is output from the keyword estimating unit 30 through a keyword retrieval equation signal output terminal 113 (step S603). In contrast, in cases where the product NY*NN*(NY+NN) is not equal to zero, a necessary information occurrence ratio Qyes denoting a ratio of the number of pieces of necessary information data D judged by the user to the number of all pieces of information data D and an unnecessary information occurrence ratio Qno denoting a ratio of the number of pieces of unnecessary information data D judged by the user to the number of all pieces of information data D are calculated in the keyword estimating unit 30 (step S604). The information occurrence ratios Qyes and Qno are expressed as follows.

Qyes=NY/(NY+NN)

Qno=NY/(NY+NN)

That is, in cases where a probability that a particular keyword is attached to necessary information data D judged by the user is higher than the necessary information occurrence ratio Qyes, it is estimated that the particular keyword is effective to retrieve necessary information data D judged by the user. As is described in the second embodiment, an occurrence number of a keyword attached to necessary information data D judged by the user is recorded in each of diagonal elements of the one-order affirmative metric signal MY1, an occurrence number of two keywords which are simultaneously occurred and are attached to necessary information data D judged by the user is recorded in each of non-diagonal elements of the one-order affirmative metric signal MY1, an occurrence number of a keyword attached to unnecessary information data D judged by the user is recorded in each of diagonal elements of the one-order negative metric signal MN1, an occurrence number of two keywords which are simultaneously occurred and are attached to unnecessary information data D judged by the user is recorded in each of non-diagonal elements of the one-order negative metric signal MN1, (hereinafter, keywords and the two keywords simultaneously occurred are called keywords). Therefore, the same calculation as those of the information occurrence ratios Qyes and Qno is performed for each element of the one-order affirmative and negative metric signals MY1 and MN1.

In detail, a value i of a counter is initially set to "0" (step S605), and a value j of another counter is initially set to "0" (step S606). Thereafter, a sum of an element MY1(i,j) of the one-order affirmative metric signal and an element MN1(i,j) of the one-order negative metric signal is calculated. The sum MY1(i,j)+MN1(i,j) indicates how many times a keyword corresponding the elements (i,j) of the one-order affirmative and negative metric signals MY1 and MN1 was occurred in the past. In cases where the sum MY1(i,j)+MN1(i,j) is very small, the keyword corresponding the elements (i,j) is not important. In this embodiment, in cases where the sum MY1(i,j)+MN1(i,j) is equal to or higher than 3, the elements (i,j) are adopted to estimate necessity of the keyword corresponding the elements (i,j). Though the judging value 3 is used in this embodiment, it is applicable that the judging value range from 3 to 4 by considering practicality.

In cases where the sum MY1(i,j)+MN1(i,j) is equal to or higher than 3 (step S607), an affirmative keyword occurrence probability Pyes and a negative keyword occurrence probability no are calculated as follows (step S608).

Pyes=(MY1(i,j)+ε)/(MY1(i,j)+MN1(i,j)+2ε)

Pno=(MN1(i,j)+ε)/(MY1(i,j)+MN1(i,j)+2ε)

Here, ε is a low positive value to prevent the keyword occurrence probabilities Pyes and Pno become zero. The affirmative keyword occurrence probability Pyes denotes a probability that a keyword corresponding to an element (i,j) is attached to a piece of necessary information data D judged by the user, and the negative keyword occurrence probability Pno denotes a probability that a keyword corresponding to an element (i,j) is attached to a piece of unnecessary information data D judged by the user.

Also, an affirmative deviation signal VY(i,j) denoting a difference between the necessary information occurrence ratio Qyes and the affirmative keyword occurrence probability Pyes and a negative deviation signal VN(i,j) denoting a difference between the unnecessary information occurrence ratio Qno and the affirmative keyword occurrence probability Pno are calculated as follows (step S609).

VY(i,j)=Qyes*log(Qyes/Pyes)*ζ

VN(i,j)=Qno*log(Qno/Pno)*ζ

ζ=tanh{(MY1(i,j)+MN1(i,j))/3}

The coefficient ζ is used to attach importance to a keyword of which an occurrence degree is high. Also, a factor 3 used for the coefficient ζ is equal to the judging value in this embodiment. However, it is applicable that the factor be higher than the judging value 3, if necessary.

In cases where a particular keyword is one-sidedly attached to necessary information judged by the user, the affirmative deviation signal VY(i,j) is a negative low value, and the value of the affirmative deviation signal VY(i,j) is lowered as a one-sided degree of the occurrence of the particular keyword is increased. Also, in cases where a particular keyword is one-sidedly attached to unnecessary information judged by the user, the negative deviation signal VN(i,j) is a negative low value, and the value of the negative deviation signal VN(i,j) is lowered as a one-sided degree of the occurrence of the particular keyword is increased.

In contrast, in cases where the sum MY1(i,j)+MN1(i,j) is lower than 3 (step S607), the affirmative deviation signal VY(i,j) and the negative deviation signal VN(i,j) are set to zero (step S610).

VY(i,j)=0

VN(i,j)=0

Thereafter, the value j is incremented by 1 (step S611), and the steps S607 to S610 are repeated until the value j exceeds a maximum value Jmax (Jmax=nofDCK) (step S612). Also, the value i is incremented by 1 (step S613), and the steps S606 to S612 are repeated until the value i exceeds a maximum value Imax (Imax=nofDCK) (step S614). Therefore, all elements VY(i,j) of the affirmative deviation signal and all elements VN(i,j) of the negative deviation signal are determined. Thereafter, a plurality of keyword estimating signals KWKD(k) respectively composed of five values are generated and output to the keyword estimating signal sorting unit 31. Each keyword estimating signal KWKD(k) is expressed as follows.

KWKD(k)=(VY(i,j)+VN(i,j), VY(i,j), VN(i,j), i, j) i, j=1,2, . . . ,nofDCK

The last two elements (i,j) of each keyword estimating signal KWKD(k) are used to identify a corresponding keyword.

In the keyword estimating signal sorting unit 31, the keyword estimating signals KWKD(k) are sorted in the order of increasing values of the keyword estimating signals KWKD(k) according to one of three methods which is indicated by a keyword retrieval equation generating method changing-over signal MCKW input from the keyword retrieval equation generating method changing-over signal input terminal 112.

Figure 16:
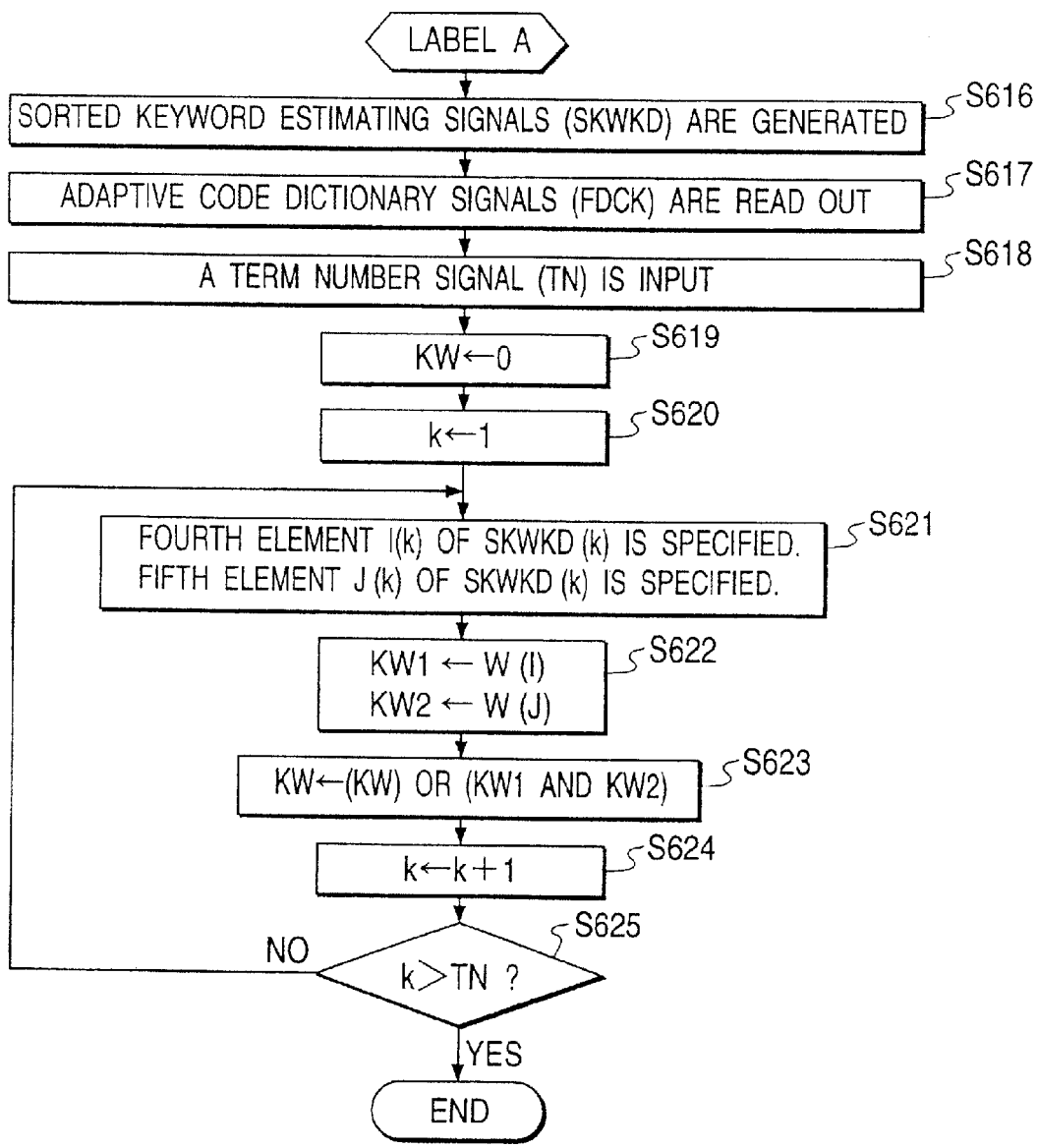
FIG. 16 shows a flow chart of a first keyword retrieval equation generating method.
Figure 17:
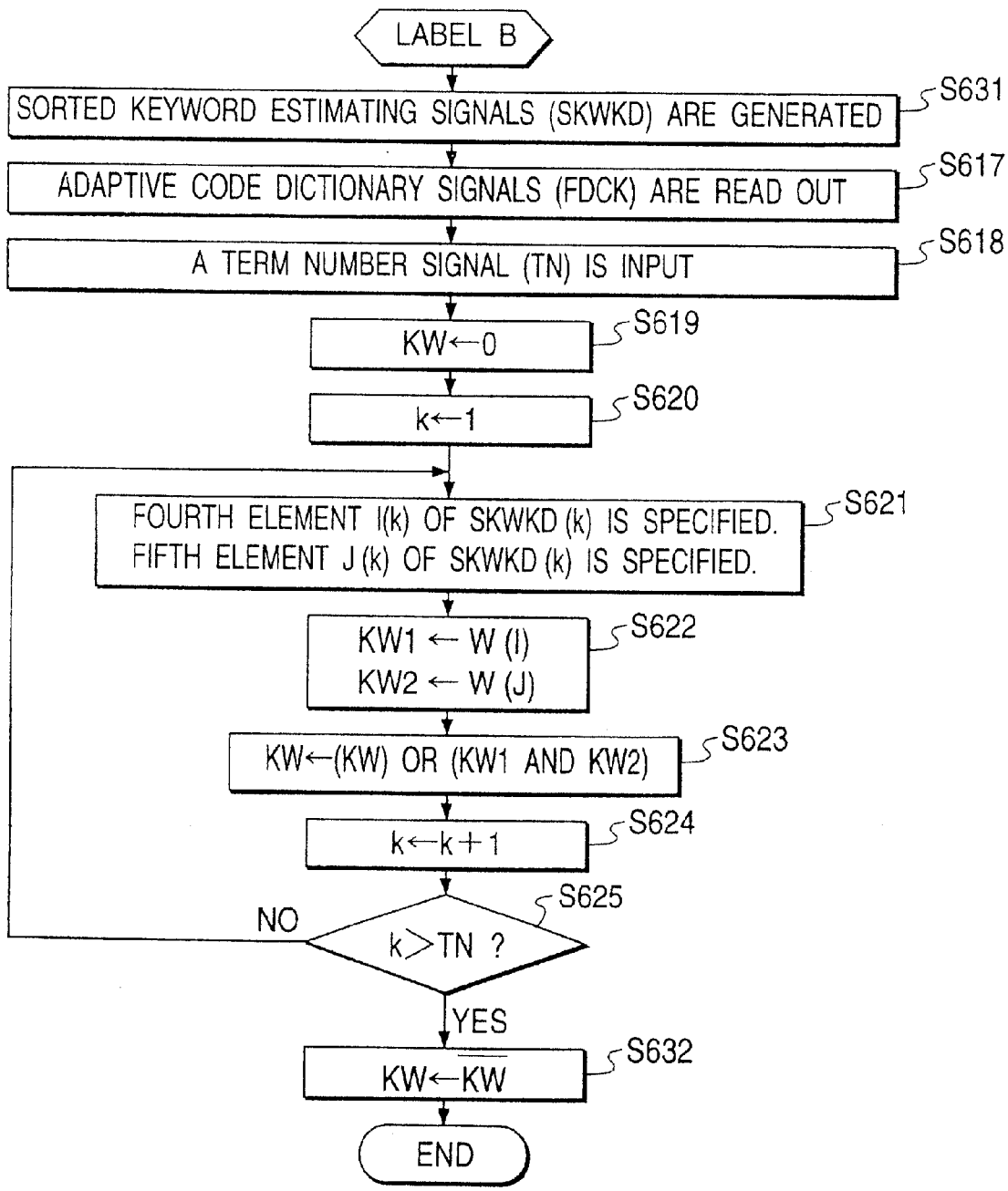
FIG. 17 shows a flow chart of a second keyword retrieval equation generating method.
Figure 18:
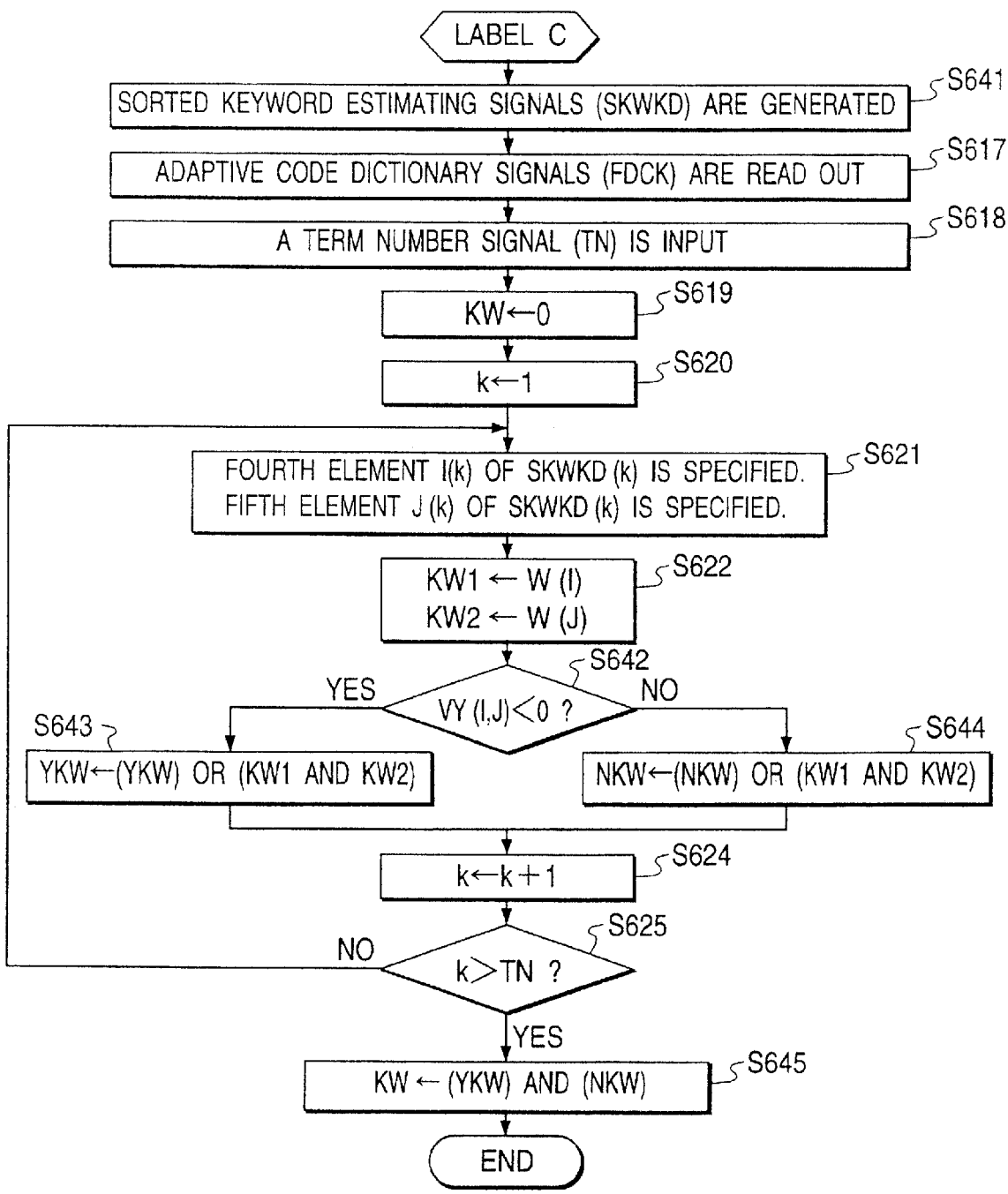
FIG. 18 shows a flow chart of a third keyword retrieval equation generating method.

In case of MCKW=1 (step S615), a first keyword retrieval equation generating method is adopted. In this method, one or more keywords often attached to necessary information data judged by the user are selectively taken out. A flow chart of the first keyword retrieval equation generating method is shown in FIG. 16. In case of MCKW=2 (step S615), a second keyword retrieval equation generating method is adopted. In this method, one or more keywords often attached to unnecessary information data judged by the user are selectively taken out. A flow chart of the second keyword retrieval equation generating method is shown in FIG. 17. In case of MCKW=3 (step S615), a third keyword retrieval equation generating method is adopted. In this method, one or more keywords often attached to necessary information data an one or more keywords often attached to unnecessary information data are taken out. A flow chart of the third keyword retrieval equation generating method is shown in FIG. 18.

In cases where the first keyword retrieval equation generating method is adopted, as shown in FIG. 16, the keyword estimating signals KWKD(k) are sorted in the order of increasing values of the second elements VY(i,j), and a plurality of sorted keyword estimating signals SKWKD(k) are generated (step S616). Therefore, a plurality of keywords indicated by the fourth and fifth elements (i,j) of the sorted keyword estimating signals SKWKD are arranged in order of necessity. Thereafter, the sorted keyword estimating signals SKW/KD are transmitted to the keyword retrieval equation generating unit 32.

In the keyword retrieval equation generating unit 32, the adaptive code dictionary signals FDCK(1) to FDCK (nofFDCK) respectively composed of a character stream W, a numeral C, the affirmative number PY and the negative number PN are read out from the adaptive code dictionary signal storing unit 24 (step S617). Thereafter, a term number signal TN indicating the number of terms in a keyword retrieval equation is input to the keyword retrieval equation generating unit 32 through a term number signal input terminal 114 (step S618). That is, the number of terms in the keyword retrieval equation is set to TN. Thereafter, a keyword retrieval equation signal KW is set to "0" (step S619), and a value k of an item number counter is initially set to "1" (step S620). Thereafter, a fourth element I=i(k) of the sorted keyword estimating signals SKWKD(k) is specified (step S621), a character stream W(I) of the adaptive code dictionary signal FDCK(I) is set to a first keyword KW1 (step S622), a fifth element J=j(k) of the sorted keyword estimating signals SKWKD(k) is specified (step S621), and a character stream W(J) of the adaptive code dictionary signal FDCK(J) is set to a second keyword KW2 (step S622). Thereafter, the keyword retrieval equation signal KW is set to a chain of keywords (KW) or (KW1 and KW2) connected by the symbol "or" (step S623). Thereafter, the value k is incremented by 1 (step S624), and the steps S621 to S623 are repeated until the value k exceeds the number TN indicated by the term number signal TN (step S625). After the sorted keyword estimating signal SKWKD(TN) is processed, the keyword retrieval equation signal KW is output.

In the above operation shown in FIG. 16, the number of terms in the keyword retrieval equation is manually set. However, it is applicable that the number of terms in the keyword retrieval equation is automatically set. For example, in cases where a value of the sorted keyword estimating signal SKWKD reaches a predetermined value, the keyword retrieval equation generating operation is finished. Also, in cases where all (or 90%, 80% or the like) of necessary information data used for the learning can be retrieved, the keyword retrieval equation generating operation is finished.

In cases where the second keyword retrieval equation generating method is adopted, as shown in FIG. 17, the keyword estimating signals KWKD(k) are sorted in the order of increasing values of the third elements VN(i,j), and a plurality of sorted keyword estimating signals SKWKD(k) are generated (step S631). Thereafter, the steps S617 to S625 are performed in the same manner as in the first keyword retrieval equation generating method. Therefore, a signal KW indicating a keyword retrieval equation for unnecessary information is obtained. Thereafter, the keyword retrieval equation signal KW is set to the negation of the signal KW to obtain a keyword retrieval equation for necessary information (step S632), and the keyword retrieval equation signal KW is output.

In cases where the third keyword retrieval equation generating method is adopted, as shown in FIG. 18, the keyword estimating signals KWKD(k) are sorted in the order of increasing values of the first elements VY(i,j)+VN(i,j), and a plurality of sorted keyword estimating signals SKWKD(k) are generated (step S641). Thereafter, the steps S617 to S622 are performed in the same manner as in the first keyword retrieval equation generating method. Thereafter, it is judged whether or not the affirmative deviation signal VY(I,J) of the sorted keyword estimating signal SKWKD(k) is negative (step S642). In cases where the affirmative deviation signal VY(I,J) is negative, the keyword retrieval equation signal KW is an affirmative keyword retrieval equation signal YKW, and a value YKW of the affirmative keyword retrieval equation signal YKW is set to a chain of keywords (YKW) or (KW1 and KW2) connected by the symbol "or" (step S643). In contrast, in cases where the affirmative deviation signal VY(I,J) is not negative, the keyword retrieval equation signal KW is a negative keyword retrieval equation signal NKW, and a value NKW of the negative keyword retrieval equation signal NKW is set to a chain of keywords (NKW) or (KW1 and KW2) connected by the symbol "or" (step S644). Thereafter, the steps S624 and S625 are performed until the sorted keyword estimating signal SKWKD (TN) is processed. Thereafter, the negative keyword retrieval equation signal NKW is set to the negation of the signal NKW to obtain a keyword retrieval equation for necessary information, the keyword retrieval equation signal KW is set to a chain of keywords (YKW) and (NKW) (step S645), and the keyword retrieval equation signal KW is output.

Accordingly, in the keyword retrieval equation generating apparatus comprising the keyword estimating unit 30, the keyword estimating signal sorting unit 31 and the keyword retrieval equation generating unit 32, a keyword retrieval equation used for the retrieval of necessary information can be automatically generated by responding that information data indicated to the user is necessary or unnecessary.

Figure 19:
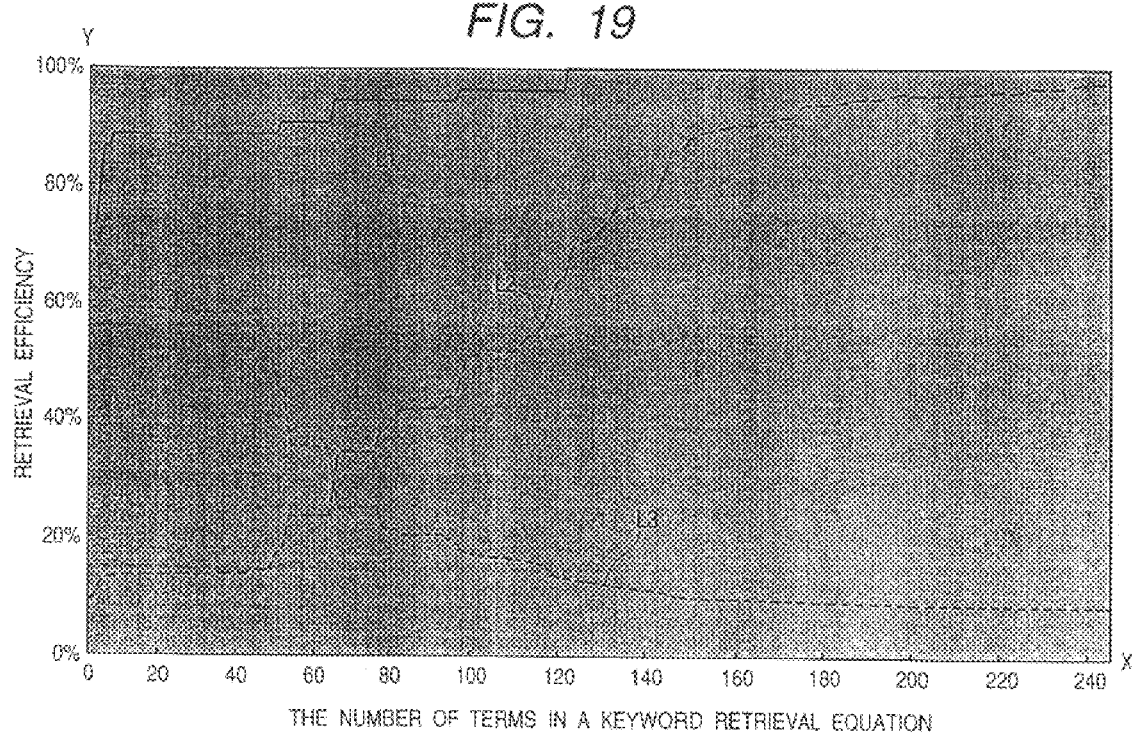
FIG. 19 shows a retrieval efficiency for many pieces of information data retrieved by using a keyword retrieval equation automatically generated according to the first keyword retrieval equation generating method.

FIG. 19 shows a retrieval efficiency (%) for many pieces of information data retrieved by using a keyword retrieval equation automatically generated in the information filtering apparatus 94 according to the first keyword retrieval equation generating method.

To obtain a retrieval efficiency, 760 pieces of information data D are prepared, a learning operation is performed in the learning unit 52 for the first 200 pieces of information data D, and the remaining 560 pieces of information data D are retrieved by using a keyword retrieval equation generated according to the first keyword retrieval equation generating method. The X co-ordinate axis indicates the number of terms in the keyword retrieval equation, and the Y co-ordinate axis indicates a ratio of retrieved information data (or retrieval efficiency for information data). A solid line L1 indicates a first ratio (%) of retrieved necessary information data to all pieces of necessary information data, a broken line L2 indicates a second ratio (%) of retrieved information data to all pieces of information data, and a dotted line L3 indicates a third ratio (%) of retrieved necessary information data to retrieved information.

As shown in FIG. 19, in cases where the number of terms in the keyword retrieval equation is about ten, about 90% of necessary information is retrieved (the solid line L1), and 60% of retrieved information data are necessary information (the broken line L3). Therefore, necessary information can be effectively retrieved in the information filtering apparatus 94 according to this embodiment.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An information filtering apparatus for taking out information from either one of an information storing medium and an information communication network, the information including information data and one or more keywords attached to the information data, the apparatus comprising:

information providing means for providing a user with the information data;

inputting means with which the user gives the apparatus an input indicative that the provided information data is necessary or unnecessary;

learning means for calculating a prediction value for predicting a user's necessity degree of each keyword attached to the provided information data on the basis of the input; and necessity estimating means for obtaining an estimation value for necessity of the provided information using the prediction value, the information providing means changing an order of the information data provided to the user according to the prediction value.

2. An information filtering apparatus according to claim 1, wherein the learning means calculates the prediction value on the basis of: a first frequency, at which the user shows that the information data included in the information to which each keyword is attached is necessary; and a second frequency, at which the user shows that the information data included in the information to which each keyword is attached is unnecessary.

3. An information filtering apparatus according to claim 1, wherein the learning means calculates the prediction value on the basis of: a first frequency, at which the user provides an input showing that the provided information data is necessary; a second frequency, at which the user provides an input showing that the provided information data is unnecessary; a third frequency, at which the user shows that the information data included in the information to which each keyword is attached is necessary; and a fourth frequency, at which the user shows that the information data included in the information to which each keyword is attached is unnecessary.

4. An information filtering apparatus for taking out information from either one of an information storing medium and an information communication network, the information including information data and one or more keywords attached to the information data, the apparatus comprising:

information providing means for providing a user with the information data;

inputting means with which the user provides to the apparatus a signal indicative that the provided information data is necessary or unnecessary;

vector converting means for converting a keyword group signal to a vector signal, the keyword group signal comprising at least one keyword signal attached to each piece of information;

metric learning means for assigning to a metric signal a value to predict a user's necessity degree to the keyword on the basis of both the signal showing that each information data is necessary or unnecessary and the vector signal; and score calculating means for calculating a score signal using at least one metric signal and the vector signal, wherein an order of providing the information data is determined on the basis of the score signal.

5. An information filtering apparatus according to claim 4, wherein the metric signal is calculated on the basis of both the signal indicative of whether or not the provided information data is necessary or unnecessary and the vector signal, the metric signal comprising both an affirmative signal based on information obtained when the signal provided with the inputting means shows that the provided information data is necessary and a negative signal based on information obtained when the signal provided with the inputting means shows that the provided information data is unnecessary.

6. An information filtering method for taking out information from either one of an information storing medium and an information communication network, the information including information data and one or more keywords attached to the information data, the method comprising the steps of:

providing a user with the information data;

permitting the user to provide an input indicative that the provided information data is necessary or unnecessary;

calculating a prediction value for predicting a user's necessity degree of each keyword attached to the provided information data on the basis of the input; and obtaining an estimation value of necessity for the provided information using the prediction value, wherein an order of the information provided in the information providing step is changed according to the prediction value.

7. An information filtering method according to claim 6, wherein the prediction value is calculated on the basis of: a first frequency, at which the user shows that the information data included in the information to which each keyword is attached is necessary; and a second frequency, at which the user shows that the information data included in the information to which each keyword is attached is unnecessary.

8. An information filtering method according to claim 6, wherein the prediction value is calculated on the basis of: a first frequency, at which the user provides an input showing that the provided information data is necessary; a second frequency, at which the user provides an input showing that the provided information data is unnecessary; a third frequency, at which the user shows that the information data included in the information to which each keyword is attached is necessary; and a fourth frequency, at which the user shows that the information data included in the information to which each keyword is attached is unnecessary.

9. An information filtering method for taking out information from either one of an information storing medium and an information communication network, the information including information data and one or more keywords attached to the information data, the method comprising the steps of:

provided a user with the information data;

permitting the user to provide a signal indicative that the provided information data is necessary or unnecessary;

converting a keyword group signal to a vector signal, the keyword group signal comprising at least one keyword signal attached to each piece of information;

assigning to a metric signal a value to predict a user's necessity degree to the keyword on the basis of both the signal showing that each information data is necessary or unnecessary and the vector signal; and calculating a score signal using at least one metric signal and the vector signal, wherein an order of providing the information data is determined on the basis of the score signal.

10. An information filtering method according to claim 9, wherein the metric signal comprises both an affirmative signal including information obtained when the signal provided by the user shows that the provided information data is necessary and a negative signal including information obtained when the signal provided by the user shows that the provided information data is unnecessary.

* * * * *

UNITED STATES PATENT AND TRADEMARK OFFICE
CERTIFICATE OF CORRECTION

PATENT NO. : 6,327,583 B1
DATED : December 4, 2001
INVENTOR(S) : Kindo

It is certified that error appears in the above-identified patent and that said Letters Patent is hereby corrected as shown below:

<u>Title page,</u>
Item [73], Assignee, should read:
-- Matsushita Electric Industrial Co., Ltd., Osaka (JP) --

Signed and Sealed this

Eighteenth Day of January, 2005

JON W. DUDAS
*Director of the United States Patent and Trademark Office*